(12) United States Patent
Wang

(10) Patent No.: US 10,778,427 B2
(45) Date of Patent: Sep. 15, 2020

(54) METHOD AND APPARATUS FOR ENCRYPTING AND DECRYPTING PRODUCT INFORMATION

(71) Applicant: ALIBABA GROUP HOLDING LIMITED, Grand Cayman (KY)

(72) Inventor: Husen Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/752,460

(22) Filed: Jan. 24, 2020

(65) Prior Publication Data
US 2020/0162244 A1 May 21, 2020

Related U.S. Application Data

(63) Continuation of application No. PCT/CN2018/110650, filed on Oct. 17, 2018.

(30) Foreign Application Priority Data

Nov. 23, 2017 (CN) .......................... 2017 1 1183121

(51) Int. Cl.
*H04L 29/06* (2006.01)
*H04L 9/08* (2006.01)
(Continued)

(52) U.S. Cl.
CPC ......... *H04L 9/088* (2013.01); *G06Q 20/3829* (2013.01); *G06Q 30/0623* (2013.01); (Continued)

(58) Field of Classification Search
CPC ............................. H04L 9/088; H04L 9/0643
(Continued)

(56) References Cited

U.S. PATENT DOCUMENTS

| 7,617,131 B2 | 11/2009 | Ananian |
| 8,688,525 B2 | 4/2014 | Minde |

(Continued)

FOREIGN PATENT DOCUMENTS

| CN | 106529969 A | 3/2017 |
| CN | 106570710 A | 4/2017 |

(Continued)

OTHER PUBLICATIONS

International Search Report and Written Opinion for PCT Application No. PCT/CN2018/110650, dated Jan. 14, 2019, 9 pages.

(Continued)

*Primary Examiner* — Longbit Chai
(74) *Attorney, Agent, or Firm* — Sheppard Mullin Richter & Hampton LLP

(57) ABSTRACT

The present specification discloses a blockchain-based method and apparatus for encrypting and decrypting product information. A producer may encrypt production information based on a unique secret code of a product. When a distributor is present, the distributor may unidirectionally generate a distribution key according to the unique secret code, and the distributor may further generate a distribution information encryption key according to the distribution key, encrypt distribution information, and generate a next distribution key according to the distribution information encryption key. That is, the product information is encrypted by unidirectionally generating keys successively along the chain. The production information is encrypted and stored based on characteristics that the unique secret code of the product is accessible only to the producer and a buyer and the blockchain is tamper-proof and forgery-proof, so that the production information is highly confidential.

18 Claims, 11 Drawing Sheets

(51) Int. Cl.
*H04L 9/06* (2006.01)
*G06Q 30/06* (2012.01)
*G06Q 20/38* (2012.01)

(52) U.S. Cl.
CPC ......... *H04L 9/0643* (2013.01); *H04L 9/0869* (2013.01); *G06Q 2220/10* (2013.01); *H04L 2209/38* (2013.01)

(58) Field of Classification Search
USPC ...................................................... 713/189
See application file for complete search history.

(56) References Cited

U.S. PATENT DOCUMENTS

| | | | |
|---|---|---|---|
| 9,569,771 | B2 | 2/2017 | Lesavich |
| 9,608,829 | B2 | 3/2017 | Spanos et al. |
| 9,704,143 | B2 | 7/2017 | Walker et al. |
| 9,818,092 | B2 | 11/2017 | Pennanen |
| 10,102,510 | B2 | 10/2018 | Yau et al. |
| 10,319,022 | B2 * | 6/2019 | Clayton ............. G06Q 30/0631 |
| 2003/0037237 | A1 | 2/2003 | Abgrall et al. |
| 2011/0103580 | A1 | 5/2011 | Hazay et al. |
| 2014/0172633 | A1 | 6/2014 | Dogin |
| 2015/0269570 | A1 | 9/2015 | Phan et al. |
| 2016/0098723 | A1 | 4/2016 | Feeney |
| 2016/0098730 | A1 | 4/2016 | Feeney |
| 2016/0267474 | A1 | 9/2016 | Lingham et al. |
| 2017/0206532 | A1 | 7/2017 | Choi |
| 2017/0213267 | A1 | 7/2017 | Degaugue et al. |
| 2017/0220815 | A1 * | 8/2017 | Ansari ................. G06Q 20/389 |

FOREIGN PATENT DOCUMENTS

| | | |
|---|---|---|
| CN | 106779742 A | 5/2017 |
| CN | 107169776 A | 9/2017 |
| CN | 107341676 A | 11/2017 |
| CN | 108055125 A | 5/2018 |
| EP | 2843606 A1 | 3/2015 |
| TW | 589569 B | 6/2004 |
| TW | 201314587 A | 4/2013 |
| TW | I419064 B | 12/2013 |
| WO | 2017027648 A1 | 2/2017 |

OTHER PUBLICATIONS

First Search for Chinese Application No. 2017111831214 dated Feb. 26, 2020 (1 Page).
Search Report for Taiwanese Application No. 107132970 dated Nov. 23, 2017 (1 Page).

* cited by examiner

METHOD AND APPARATUS FOR ENCRYPTING AND DECRYPTING PRODUCT INFORMATION

CROSS REFERENCE TO RELATED APPLICATIONS

The present application is a continuation application of International Patent Application No. PCT/CN2018/110650, filed on Oct. 17, 2018, which claims priority to Chinese Patent Application No. 201711183121.4, filed on Nov. 23, 2017. The entire content of the above referenced applications are incorporated herein by reference.

TECHNICAL FIELD

The present specification relates to the field of computer technologies, and in particular, to a method and apparatus for encrypting and decrypting product information.

BACKGROUND

At present, with the development of industries, online and offline trading and distribution of products become very common. The products mentioned herein may be physical products, such as industrial products and handicrafts, or may be computer products, such as software and network storage space.

For a product, there is usually a producer and a buyer, that is, a party producing the product and a party buying the product. In most cases, there is also a distributor, that is, one or more parties distributing the product. For example, for a batch of beverage products, there may be a producer (a manufacturer of the beverage) and a buyer (a consumer), or at least one distributor (an agent, a retailer, or the like) is present between the producer and the buyer. In a complete distribution process, each party except for the buyer may generate a piece of product information for the product (the producer may generate production information, and the distributor may generate distribution information). The information may be connected in series to represent the complete process from the producer to the buyer. The product information is the basis for tracing the product.

However, the product information generally needs to be kept confidential. That is, the product information of each party is accessible only to the manufacturer and the buyer, and needs to be kept confidential from the distributors or stealers. Therefore, it is necessary to provide a solution to keep the product information generated by each party confidential, and to ensure that the buyer may trace the product.

SUMMARY

Embodiments of the present specification provide a blockchain-based method for encrypting and decrypting product information, to keep product information confidential in a product distribution process, and ensure that a buyer may obtain the product information.

The embodiments of the present specification provide a blockchain-based apparatus for encrypting and decrypting product information, to keep product information confidential in a product distribution process, and ensure that a buyer may obtain the product information.

To resolve the foregoing technical problems, the embodiments of the present specification are implemented as following technical solutions.

In various implementations, a blockchain-based method for encrypting product information is provided. The method is applied to a producer, and includes: unidirectionally generating a production encryption key according to a unique secret code of a product; encrypting production information of the product according to the production encryption key, to generate production information encryption data; generating a production information query identifier according to the production encryption key; and writing a production information set to a blockchain, where the production information set includes the production information query identifier and the production information encryption data.

In some embodiments, the unidirectionally generating a production encryption key according to a unique secret code of a product comprises: receiving a production random number that is generated by a producer when the producer produces the product; and unidirectionally generating the production encryption key according to a combination of the unique secret code and the production random number.

In some embodiments, the method further comprises: unidirectionally generating a random number query identifier according to the unique secret code; creating a unique identifier for the product in a trusted repository; and sending the random number query identifier and the production random number to the trusted repository, wherein the random number query identifier and the production random number are associated with the unique identifier.

In some embodiments, the generating a production information query identifier according to the production encryption key comprises: unidirectionally generating a first distribution key according to the production encryption key, and unidirectionally generating the production information query identifier according to the first distribution key; and the writing a production information set to a blockchain comprises: encrypting the first distribution key according to a first public key, to generate first distribution key encryption data, wherein the first public key is a distribution public key of a first distributor; unidirectionally generating a first distribution key query identifier according to the first public key; and writing a production information set to the blockchain, wherein the production information set comprises the first distribution key query identifier, the production information query identifier, the first distribution key encryption data, and the production information encryption data.

In some embodiments, the encrypting the first distribution key according to a first public key, to generate first distribution key encryption data comprises: encrypting a combination of a plain code of the product and the first distribution key according to the first public key, to generate the first distribution key encryption data.

In some embodiments, the writing a production information set to a blockchain comprises: signing the production information set according to a production private key, wherein the production private key is a private key generated by a producer when the producer produces the product; and writing the signed production information set to the blockchain.

In another aspect of the present disclosure, a blockchain-based method for encrypting product information is provided. The method is applied to a distributor, and includes: unidirectionally generating an $n^{th}$ distribution key query identifier according to an $n^{th}$ public key; reading $n^{th}$ distribution key encryption data from a blockchain according to the $n^{th}$ distribution key query identifier; decrypting the $n^{th}$ distribution key encryption data according to an $n^{th}$ private key, to obtain an $n^{th}$ distribution key; unidirectionally generating an $n^{th}$ encryption key according to the $n^{th}$ distribution key; encrypting $n^{th}$ distribution information according to the $n^{th}$ encryption key, to generate $n^{th}$ distribution information encryption data; generating an $n^{th}$ distribution information query identifier according to the $n^{th}$ encryption key; and writing an $n^{th}$ information set to the blockchain, where the $n^{th}$ information set includes the $n^{th}$ distribution information query identifier and the $n^{th}$ distribution information encryption data, where n is a natural number greater than 0.

In some embodiments, the unidirectionally generating an $n^{th}$ encryption key according to the $n^{th}$ distribution key comprises: receiving an $n^{th}$ random number that is generated by an $n^{th}$ distributor when the $n^{th}$ distributor receives a product; and unidirectionally generating the $n^{th}$ encryption key according to a combination of the $n^{th}$ distribution key and the $n^{th}$ random number.

In some embodiments, the method further comprises: sending the $n^{th}$ random number to a trusted repository, wherein the $n^{th}$ random number is associated with a unique identifier of the product.

In some embodiments, the generating an $n^{th}$ distribution information query identifier according to the $n^{th}$ encryption key comprises: unidirectionally generating an $(n+1)^{th}$ distribution key according to the $n^{th}$ encryption key, and unidirectionally generating the $n^{th}$ distribution information query identifier according to the $(n+1)^{th}$ distribution key; and the writing an $n^{th}$ information set to the blockchain comprises: encrypting the $(n+1)^{th}$ distribution key according to an $(n+1)^{th}$ public key, to generate $(n+1)^{th}$ distribution key encryption data, wherein the $(n+1)^{th}$ public key is a distribution public key of an $(n+1)^{th}$ distributor; unidirectionally generating an $(n+1)^{th}$ distribution key query identifier according to the $(n+1)^{th}$ public key; and writing an $n^{th}$ information set to the blockchain, wherein the $n^{th}$ information set comprises the $(n+1)^{th}$ distribution key query identifier, the $n^{th}$ distribution information query identifier, the $(n+1)^{th}$ distribution key encryption data, and the $n^{th}$ distribution information encryption data.

In some embodiments, the encrypting the $(n+1)^{th}$ distribution key according to an $(n+1)^{th}$ public key, to generate $(n+1)^{th}$ distribution key encryption data comprises: encrypting a combination of a plain code of the product and the $(n+1)^{th}$ distribution key according to the $(n+1)^{th}$ public key, to generate the $(n+1)^{th}$ distribution key encryption data.

In some embodiments, the writing an $n^{th}$ information set to the blockchain comprises: signing the $n^{th}$ information set according to the $n^{th}$ private key; and writing the signed $n^{th}$ information set to the blockchain.

In some embodiments, before the decrypting the $n^{th}$ distribution key encryption data according to an $n^{th}$ private key, the method further comprises: performing signature verification on a signed production information set according to a production public key; or performing signature verification on a signed $n^{th}$ information set according to the $n^{th}$ public key.

Yet another aspect of the present disclosure is directed to a blockchain-based method for decrypting product information. The method is applied to a buyer, and includes: unidirectionally generating a production encryption key according to a unique secret code of a product; generating a production information query identifier according to the production encryption key; reading production information encryption data of the product from a blockchain according to the production information query identifier; and decrypting the production information encryption data according to the production encryption key, to obtain production information.

In some embodiments, the method further comprises: unidirectionally generating a first distribution key according to the production encryption key, unidirectionally generating an $n^{th}$ encryption key according to an $n^{th}$ distribution key, and unidirectionally generating an $(n+1)^{th}$ distribution key according to the $n^{th}$ encryption key; reading $n^{th}$ distribution information encryption data of the product from the blockchain according to an $n^{th}$ distribution information query identifier; and decrypting the $n^{th}$ distribution information encryption data according to the $n^{th}$ encryption key, to obtain $n^{th}$ distribution information, wherein n is a natural number greater than 0.

In some embodiments, wherein the unidirectionally generating a production encryption key according to a unique secret code of a product comprises: unidirectionally generating a random number query identifier according to the unique secret code of the product; obtaining a production random number corresponding to the random number query identifier from a trusted repository; and unidirectionally generating the production encryption key according to a combination of the unique secret code and the production random number.

In some embodiments, the unidirectionally generating an $n^{th}$ encryption key according to the $n^{th}$ distribution key comprises: obtaining an $n^{th}$ random number corresponding to an $n^{th}$ random number query identifier from a trusted repository; and unidirectionally generating the $n^{th}$ encryption key according to a combination of the $n^{th}$ distribution key and the $n^{th}$ random number, wherein n is a natural number greater than 0.

In some embodiments, the reading production information encryption data of the product from a blockchain comprises: unidirectionally generating the production encryption key according to a combination of the unique secret code and the production random number, unidirectionally generating the first distribution key, and unidirectionally generating the production information query identifier; and reading the production information encryption data in a production information set from the blockchain according to the production information query identifier; and the reading $n^{th}$ distribution information encryption data of the product from the blockchain comprises: unidirectionally generating the $n^{th}$ encryption key according to a combination of the $n^{th}$ distribution key and the $n^{th}$ random number, unidirectionally generating the $(n+1)^{th}$ distribution key, and unidirectionally generating the $n^{th}$ distribution information query identifier; and reading the $n^{th}$ distribution information encryption data in an $n^{th}$ information set from the blockchain according to the $n^{th}$ distribution information query identifier.

In the embodiments provided in the present specification, the producer may unidirectionally generate the production encryption key by using the unique secret code of the product, then encrypt the production information of the product according to the production encryption key to generate the production information encryption data, generate the production information query identifier according to the production encryption key, and write the production information set including the production information query identifier and the production information encryption data to the blockchain. The buyer may unidirectionally generate the production encryption key by using the unique secret code of the product, then generate the production information query identifier according to the production encryption key, and decrypt the production information encryption data that is read from the blockchain, to obtain the production information. When a distributor is present in a product distribution process, the first distribution key for distribution to the first distributor may be unidirectionally generated according to the production encryption key, then the production information query identifier is unidirectionally generated, the first distribution key is encrypted according to the first public key to generate first distribution key encryption data, the first distribution key query identifier is unidirectionally generated according to the first public key, and the production information set including the first distribution key query identifier, the production information query identifier, the first distribution key encryption data, and the production information encryption data is written to the blockchain. The production information is encrypted and decrypted based on characteristics that the unique secret code of the product is accessible only when the buyer destroys the integrity of the product and the blockchain is tamper-proof and forgery-proof, so that the production information is highly confidential. In addition, the production information is written to the blockchain, so that a next distributor may write product information to the blockchain through successive encryption along the chain.

BRIEF DESCRIPTION OF THE DRAWINGS

To describe the technical solutions in the embodiments in this specification or in the prior art more clearly, the following briefly introduces the accompanying drawings required for describing the embodiments or the prior art. Apparently, the accompanying drawings in the following description show merely some embodiments in this specification, and a person of ordinary skill in the art may still derive other drawings from these accompanying drawings without creative efforts.

DETAILED DESCRIPTION OF THE INVENTION

To make the objectives, technical solutions, and advantages of the specification clearer, the technical solutions of the specification will be clearly and completely described below with reference to specific embodiments and corresponding accompanying drawings. Apparently, the described embodiments are only some embodiments rather than all the embodiments of the specification. All other embodiments obtained by a person of ordinary skill in the art based on the embodiments of the specification without creative efforts shall fall within the protection scope of the specification.

The technical solution provided by various embodiments of the specification will be described in detail below with reference to the accompanying drawings.

Embodiment 1

As described above, in a complete distribution process of a product, each party except for a buyer generates a piece of product information for the product. For example, a producer (a manufacturer of the product) may generate a piece of production information (which may include feature information such as the product and the manufacturer) for the product in a production process. After receiving the product, a distributor may generate a piece of distribution information (which may include feature information such as a time, a price, and an address of the distributor). The information may be connected in series as the basis for tracing the product. The tracing may refer to following the complete distribution process of the specific product from production, through a middle part such as distribution, and to the buyer. The product information needs to be kept confidential from a party other than the buyer and the producer (e.g., a distributor and a stealer), and it needs to be ensured that the buyer may view the product information. Therefore, it is necessary to provide a solution to keep the product information generated by each party confidential, and to ensure that the buyer may trace the product.

The present specification provides a blockchain-based method for encrypting and decrypting product information, to keep product information confidential in a product distribution process, and ensure that a buyer may obtain the product information. The method is applicable when a producer and a buyer are present in a distribution process, and also applicable when a buyer, one or more distributors, and a buyer are present in a distribution process.

Figure 1:
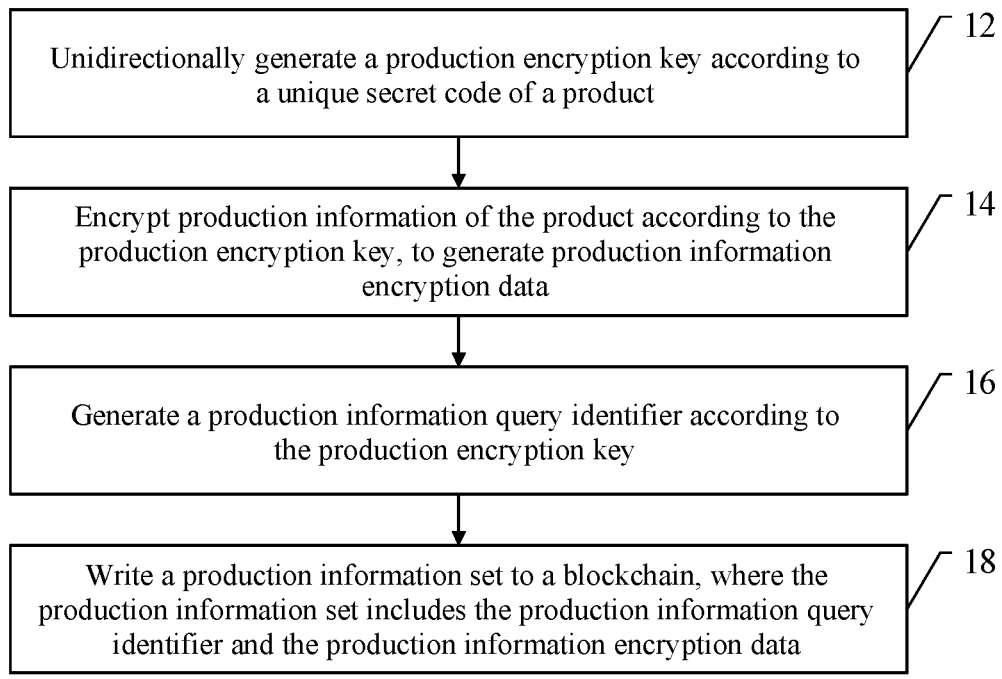
FIG. 1 is a schematic flowchart of a blockchain-based method for encrypting product information, according to Embodiment 1.

Embodiment 1 describes a method for encrypting product information by using an example where a producer and a buyer may be present in a distribution process. Specifically, a blockchain-based method for encrypting product information is described first, which is applied to the producer of the present producer and buyer. A procedure of the method is shown in FIG. 1, and includes the following steps.

At step 12, the method may unidirectionally generate a production encryption key according to a unique secret code of a product.

The unique secret code of the product may refer to an identification code hidden inside the product. The unique secret code may be found only when the buyer destroys the integrity of the product and starts to use the product. In other words, the unique secret code of the product is accessible only to the producer and the buyer. For example, for a bottled beverage, a unique secret code of the product may be found from an inner side of a bottle cap only after the bottle is opened, that is, the integrity of the product is destroyed. Therefore, the producer may encrypt product information based on the unique secret code, so that the unique secret code may be found only when the buyer destroys the integrity of the product and starts to use the product.

Specifically, the production encryption key may be generated based on the unique secret code of the product by using a one-way function. According to the one-way function, an output may be calculated for an input, but an input may not be determined from a known output. Alternatively, the production encryption key may be generated based on the unique secret code of the product by using a one-way hash function. According to the one-way hash function, an input message string of any length is transformed into an output string of a fixed length, and it is difficult to obtain the input string from the output string. Therefore, the production encryption key may not be determined without the unique secret code. Herein, the unique secret code may be represented by pincode, and the one-way function may be represented by hash. Accordingly, the production encryption key unidirectionally generated according to the unique secret code of the product may be represented by $key_{production\ encryption}$=hash(pincode).

In some embodiments, to further improve the security of $key_{production\ encryption}$, the above step may further include: receiving a production random number that is generated by the producer when the producer produces the product; and unidirectionally generating the production encryption key according to a combination of the unique secret code and the production random number. Specifically, when the producer produces the product, the producer may generate a production random number. The production random number may be used to unidirectionally calculate pincode, which may be represented by $nonce_{production}$. The combination of the unique secret code and the production random number may be represented by (pincode$\|nonce_{production}$). Accordingly, there may be $key_{production\ encryption}$=hash(pincode$\|nonce_{production}$). In some embodiments, in the combination of pincode and $nonce_{production}$ herein, character strings may be simply connected sequentially, that is, pincode character string is arranged before $nonce_{production}$ character string. Alternatively, character strings may be arranged in a preset alternating manner. For example, pincode may be a 6-bit character string, $nonce_{production}$ may be a 4-bit character string, and the preset alternating manner may be the first three bits of pincode+the first two bits of $nonce_{production}$+the last three bits of pincode+the last two bits of $nonce_{production}$.

At step 14, the method may encrypt production information of the product according to the production encryption key, to generate production information encryption data.

As mentioned above, the production encryption key $key_{production\ encryption}$ generated in the previous step needs support from pincode, and pincode is accessible only to the buyer. Therefore, in this step, the production information of the product may be encrypted according to $key_{production\ encryption}$, to generate the production information encryption data. Specifically, the production information may be product information that is generated by the producer when the producer produces the product. The product information may be represented by m, and the production information may be represented by $m_{production}$. In some embodiments, the privacy of $m_{production}$ usually needs to be protected, which may also be understood as protecting the privacy of the producer. Therefore, high security may be achieved by encrypting the production information according to pincode that is accessible only to the buyer.

The encryption may be implemented by using an encryption function. The encryption function enc may refer to a function for encrypting information. The function includes two inputs: a key and information. After the encryption, information encryption data may be generated (in this embodiment, information is the product information m), which may be represented by enc(the encryption key, the product information m). From the information encryption data enc(the encryption key, the product information m) obtained, m may not be obtained through parsing without the encryption key; from enc(the encryption key, the product information m) and m obtained, the encryption key may not be obtained. Herein, if the encryption key is an asymmetric key, enc is asymmetric encryption; if the encryption key is a symmetric key, enc is symmetric encryption. For asymmetric encryption, a public key pk and a private key sk may be present. In this step, the generated production information encryption data may be represented by enc($key_{production\ encryption}$, $m_{production}$).

As described above, $key_{production\ encryption}$ may be unidirectionally generated by using pincode, or may be unidirectionally generated by using pincode$\|nonce_{production}$. It may be seen that when $nonce_{production}$ is introduced, pincode and $nonce_{production}$ are critical to obtain $key_{production\ encryption}$. It is known that pincode is accessible only to the buyer. Therefore, to protect $nonce_{production}$, the method may further include: unidirectionally generating a random number query identifier according to the unique secret code; creating a unique identifier for the product in a trusted repository; and sending the random number query identifier and the production random number to the trusted repository, where the random number query identifier and the production random number are associated with the unique identifier.

Specifically, to protect $nonce_{production}$, $nonce_{production}$ may be sent to a trusted repository. When the buyer needs to generate $key_{production\ encryption}$ and decrypt enc($key_{production\ encryption}$, $m_{production}$), the buyer may find $nonce_{production}$ from the trusted repository. The trusted repository may be a highly secure national institution or enterprise. The trusted repository may store production random numbers for different products. Therefore, a unique identifier may be created for each different product. To find $nonce_{production}$, a random number query identifier hash(pincode) may be unidirectionally generated according to the unique secret code, and when $nonce_{production}$ is sent to the trusted repository, hash(pincode) and $nonce_{production}$ may be both sent to the trusted repository, and associated with the unique identifier, so that the buyer may find $nonce_{production}$ by using hash(pincode). When $nonce_{production}$ is introduced, $key_{production\ encryption}$=hash(pincode $nonce_{production}$), and the random number query identifier hash(pincode) does not affect the security of $key_{production\ encryption}$.

According to the premise of this embodiment that only the producer and the buyer are present in the product distribution process, the producer may send $enc(key_{production\ encryption}, m_{production})$ to the buyer for the buyer to parse $m_{production}$.

At step 16, the method may generate a production information query identifier according to the production encryption key.

At step 18, the method may write a production information set to a blockchain, where the production information set includes the production information query identifier and the production information encryption data.

The blockchain may be a cryptology-ensured tamper-proof and forgery-proof distributed database with a chain-type data structure in which data blocks are sequentially connected and combined in chronological order. Since $enc(key_{production\ encryption}, m_{production})$ may be written to the blockchain in which tampering and forgery may be effectively prevented, high security and privacy may be achieved. The blockchain includes a large amount of data. Therefore, to enable the buyer to quickly find $enc(key_{production\ encryption}, m_{production})$, a production information query identifier may be generated according to $key_{production\ encryption}$ by using, for example, a one-way function, or according to a specific quantity of bits in $key_{production\ encryption}$, or according to a combination of the specific quantity of bits and the one-way function, or by performing one-way calculation twice. A production information set including the production information query identifier and $enc(key_{production\ encryption}, m_{production})$ may be written to the blockchain for the buyer to read.

Figure 2:
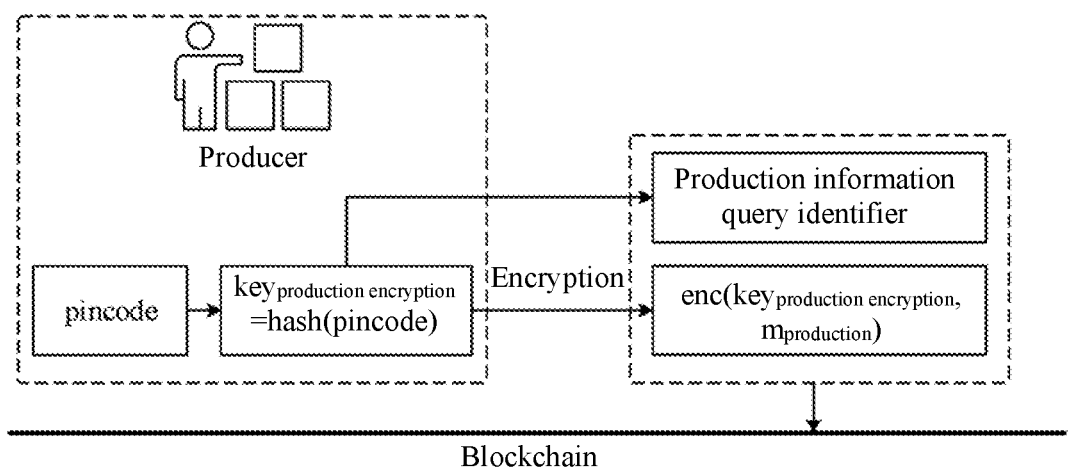
FIG. 2 is a schematic diagram of a blockchain-based method for encrypting product information, according to Embodiment 1.
Figure 3:
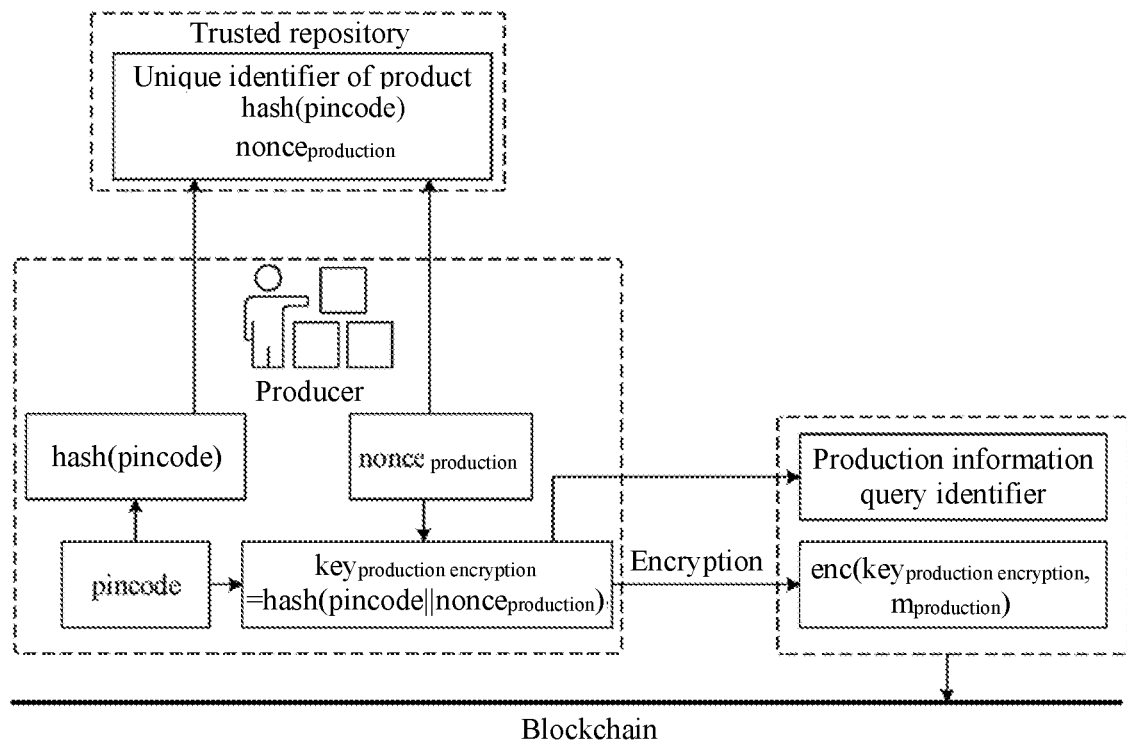
FIG. 3 is a schematic diagram of a blockchain-based method for encrypting product information, according to Embodiment 1.

FIG. 2 is a schematic diagram of an implementation of the method. FIG. 3 is a schematic diagram of another implementation of the method. A difference lies in that in the implementation shown in FIG. 3, $nonce_{production}$ is introduced when $key_{production\ encryption}$ is generated, to facilitate protection of $enc(key_{production\ encryption}, m_{production})$.

It should be noted that in this embodiment and the following description, the "product" mentioned is the same product, that is, the product produced by the producer. For example, the product in the present specification may be "a batch of beverages" or "a 50 GB network storage space". Information, keys, public keys, private keys, and the like about the product correspond to the same product.

With the method provided in Embodiment 1, the producer unidirectionally generates the production encryption key by using the unique secret code of the product, then encrypts the production information of the product according to the production encryption key to generate the production information encryption data, generates the production information query identifier according to the production encryption key, and write the production information set including the production information query identifier and the production information encryption data to the blockchain. The production information is encrypted and stored based on characteristics that the unique secret code of the product is accessible only to the producer and the buyer and the blockchain is tamper-proof and forgery-proof, thus the production information is highly confidential. In addition, the confidentiality of the production information may be further enhanced by using the production random number.

Embodiment 2

Figure 4:
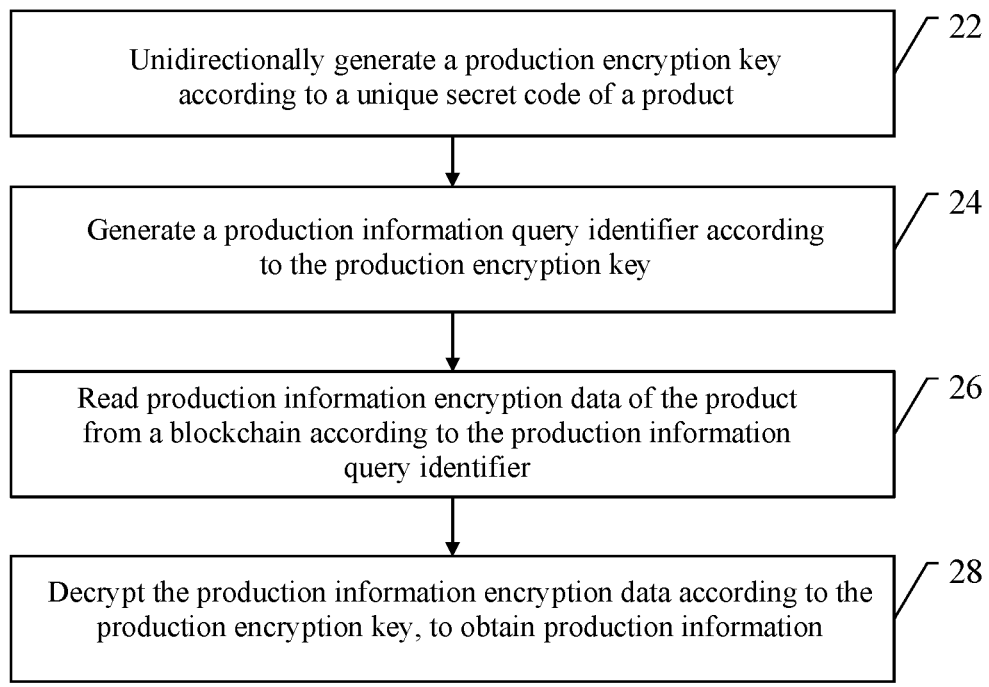
FIG. 4 is a schematic flowchart of a blockchain-based method for decrypting product information, according to Embodiment 2.

This embodiment describes a blockchain-based method for encrypting and decrypting product information by using an example that a producer and a buyer are present in a distribution process, to keep product information confidential in the product distribution process, and ensure that the buyer may obtain the product information. Specifically, this embodiment describes a blockchain-based method for decrypting product information, which is applied to the buyer of the present producer and buyer. A procedure of the method is shown in FIG. 4, including the following steps.

At step 22, the method may unidirectionally generate a production encryption key according to a unique secret code of a product.

As described in Embodiment 1, the producer may unidirectionally generate $key_{production\ encryption}$ according to pincode, that is, $key_{production\ encryption} = hash(pincode)$. Also, a characteristic of pincode is described, that is, the buyer may find pincode after destroying the integrity of the product and starting to use the product. Therefore, the buyer may unidirectionally generate $key_{production\ encryption}$ according to pincode.

Further, as described in Embodiment 1, to further improve the security of $key_{production\ encryption}$, the producer may generate a production random number $nonce_{production}$ when producing the product. Therefore, In some embodiments, this step may include: unidirectionally generate a random number query identifier according to the unique secret code of the product; obtaining a production random number corresponding to the random number query identifier from a trusted repository; and unidirectionally generate the production encryption key according to a combination of the unique secret code and the production random number.

Specifically, when $nonce_{production}$ is introduced, $key_{production\ encryption} = hash(pincode\ (nonce_{production}))$. The producer generates a random number query identifier hash(pincode) according to pincode, and sends hash(pincode) and $nonce_{production}$ to the trusted repository, where hash(pincode) and $nonce_{production}$ are both associated with a unique identifier created for the product. Therefore, the buyer may also unidirectionally generate hash(pincode) according to pincode, and may find $nonce_{production}$ in the trusted repository by using hash(pincode), and then unidirectionally generate $key_{production\ encryption} = hash(pincode\ (nonce_{production}))$. A combination of pincode and $nonce_{production}$ is described in Embodiment 1. In this step, a same combination manner may be used for combination, so that the generated $key_{production\ encryption}$ is consistent with $key_{production\ encryption}$ generated by the producer.

At step 24, the method may generate a production information query identifier according to the production encryption key.

A manner of generating a production information query identifier is described in Embodiment 1. In this step, the buyer may generate the production information query identifier in the same manner as the producer, to ensure consistency.

At step 26, the method may read production information encryption data of the product from a blockchain according to the production information query identifier.

As described in Embodiment 1, the producer writes a production information set including the production information query identifier and $enc(key_{production\ encryption}, m_{production})$ to the blockchain. Therefore, in this step, $enc(key_{production\ encryption}, m_{production})$ may be read according to the production information query identifier.

At step 28, the method may decrypt the production information encryption data according to the production encryption key, to obtain production information.

In this step, according to a characteristic of the encryption function, $enc(key_{production\ encryption}, m_{production})$ may be decrypted according to $key_{production\ encryption}$ to obtain $m_{production}$. The buyer may find pincode only after destroying the integrity of the product and starting to use the product. Therefore, even when a stealer obtains $enc(key_{production\ encryption}, m_{production})$, because pincode may not be obtained, $enc(key_{production\ encryption}, m_{production})$ may not be decrypted. If $nonce_{production}$ is further introduced, because pincode may not be obtained and accordingly hash(pincode) may not be obtained, it is impossible to determine $key_{production\ encryption}$=hash(pincode||$nonce_{production}$).

Figure 5:
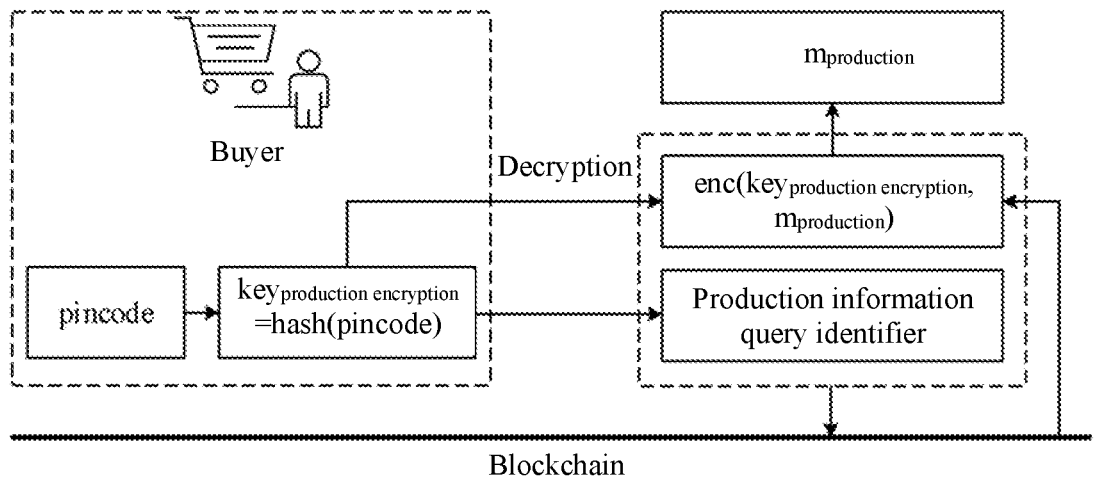
FIG. 5 is a schematic diagram of a blockchain-based method for decrypting product information, according to Embodiment 2.
Figure 6:
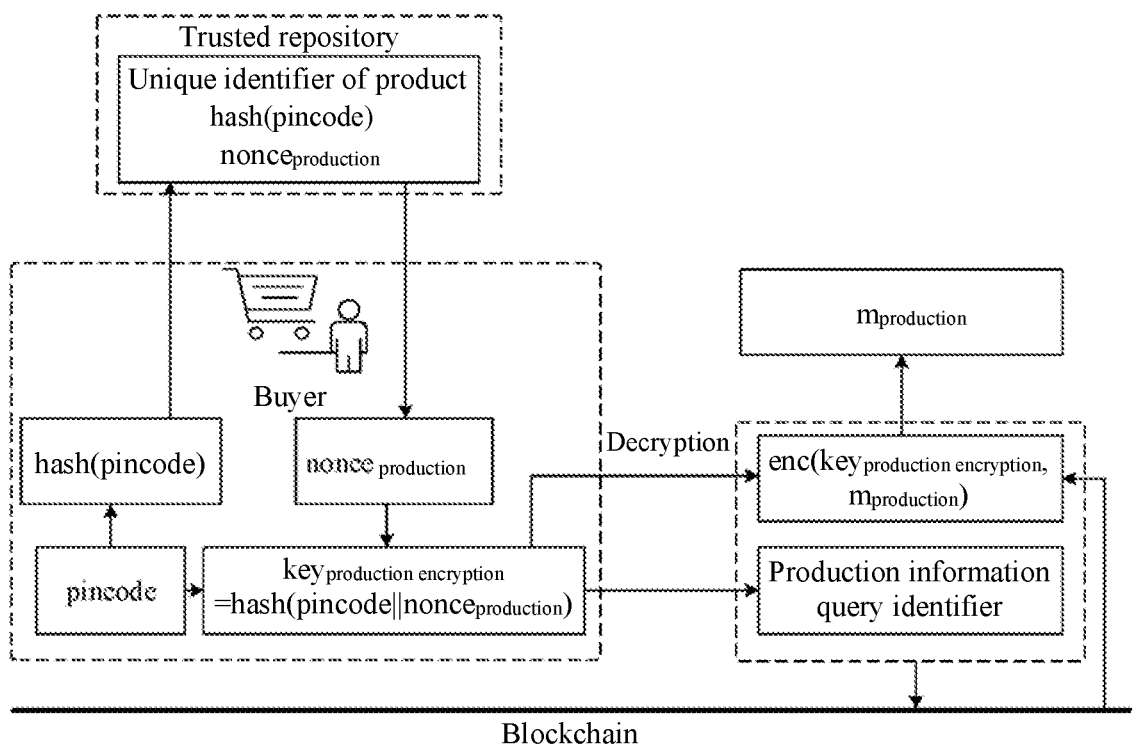
FIG. 6 is a schematic diagram of a blockchain-based method for decrypting product information, according to Embodiment 2.

FIG. 5 is a schematic diagram of an implementation of the method. FIG. 6 is a schematic diagram of another implementation of the method. A difference lies in that in the implementation shown in FIG. 6, $nonce_{production}$ is introduced when $key_{production\ encryption}$ is generated, to increase the difficulty in parsing $m_{production}$.

With the method provided in Embodiment 2, the buyer unidirectionally generates the production encryption key by using the unique secret code of the product, then generates the production information query identifier according to the production encryption key, and decrypts the production information encryption data that is read from the blockchain, to obtain the production information. The production information is decrypted based on characteristics that the unique secret code of the product is accessible only when the buyer destroys the integrity of the product and the blockchain is tamper-proof and forgery-proof, and thus the production information is highly confidential. In addition, the confidentiality of the production information may be further enhanced by using the production random number.

Embodiment 3

The foregoing two embodiments describe a case that a producer and a buyer are present in a distribution process. In some embodiments, one or more distributors, for example, an agent, a wholesaler, or a retailer, may be present to conveniently distribute a product from the producer to the buyer. A distributor may generate distribution information for the product in the distribution process. The distribution information may include private information of the distributor, which therefore needs to be kept confidential. That is, the product information needs to be kept confidential from another distributor and a stealer, and it needs to be ensured that the buyer may view the product information while the distributor may not obtain production information and distribution information of the another distributor.

Figure 7:
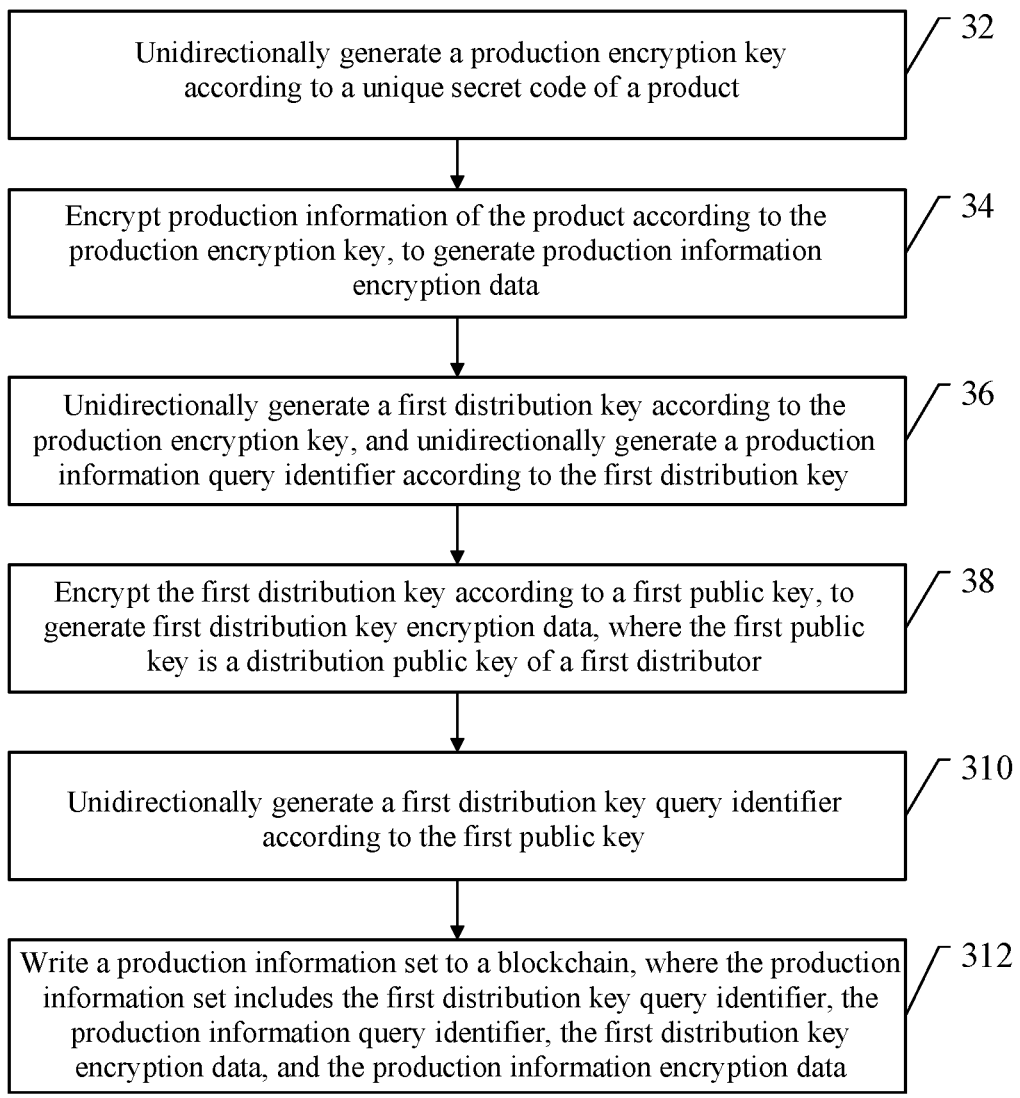
FIG. 7 is a schematic flowchart of a blockchain-based method for encrypting product information, according to Embodiment 3.

Therefore, this embodiment describes a blockchain-based method for encrypting and decrypting product information by using an example that a producer, a distributor, and a buyer are present in a distribution process. Specifically, a blockchain-based method for encrypting product information is described first, which is applied to the producer of the present producer, distributor, and buyer. A procedure of the method is shown in FIG. 7, and includes the following steps.

At step 32, the method may unidirectionally generate a production encryption key according to a unique secret code of a product.

At step 34, the method may encrypt production information of the product according to the production encryption key, to generate production information encryption data.

The foregoing two steps are similar to those in Embodiment 1. Details are not described herein again. $enc(key_{production\ encryption}, m_{production})$ may be generated according to the implementation shown in FIG. 2 or FIG. 3.

At step 36, the method may unidirectionally generate a first distribution key according to the production encryption key, and unidirectionally generate a production information query identifier according to the first distribution key.

The first distribution key mentioned herein may be used for distribution to a first distributor. For example, if a wholesaler is a first distributor after the producer, the wholesaler may be the first distributor. Considering that pincode is accessible only to the producer and the buyer who has destroyed the integrity of the product, encryption keys may be generated based on pincode in the distribution process successively along a chain. Specifically, the first distribution key may be unidirectionally generated according to the production encryption key by using a characteristic of a one-way function that an input may not be obtained by reversely parsing a known result. The first distribution key may be represented by $key_{first\ distribution}$.

As described in Embodiment 1, production information encryption data may be written to a blockchain, and the buyer may generate a production information query identifier by using $key_{production\ encryption}$ to read $enc(key_{production\ encryption}, m_{production})$ from the blockchain. To keep production information confidential from the distributor, the distributor may not obtain $key_{production\ encryption}$. However, the distributor may need to read data from the blockchain. Therefore, a production information query identifier may be generated for the distributor by not directly using $key_{production\ encryption}$. That is, the production information query identifier is unidirectionally generated according to $key_{first\ distribution}$, which may be represented by hash$(key_{first\ distribution})$.

At step 38, the method may encrypt the first distribution key according to a first public key, to generate first distribution key encryption data, where the first public key is a distribution public key of a first distributor.

Because $key_{first\ distribution}$ is generated by using $key_{production\ encryption}$ and $key_{first\ distribution}$ may be used for distribution to the first distributor, the first distributor may be allowed to obtain $key_{first\ distribution}$, but may not obtain $key_{production\ encryption}$. Therefore, $key_{first\ distribution}$ may be encrypted by using the first public key. The first public key may be represented by $pk_1$, which may refer to the distribution public key of the first distributor. Specifically, $key_{first\ distribution}$ is encrypted by using $pk_1$ of the first distributor, to generate first distribution key encryption data $enc(pk_1, key_{first\ distribution})$. Accordingly, the first distributor may perform decryption according to a first private key ski.

In some embodiments, to further protect privacy of the product distribution process, a plain code of the product may be introduced when $enc(pk_1, key_{first\ distribution})$ is generated. In some embodiments, this step may include: encrypting a combination of the plain code of the product and the first distribution key according to the first public key, to generate the first distribution key encryption data. The plain code qcode may be arranged outside the product and globally unique. Any party may obtain qcode after receiving the product, but it is uneasy for a party that does not have the product to obtain qcode (for example, a stealer, which, however, may steal qcode by a malicious means). Therefore, the privacy of distribution may be further enhanced by introducing qcode to the distribution process. Specifically, there may be $enc(pk_1, qcode\ key_{first\ distribution})$.

At step 310, the method may unidirectionally generate a first distribution key query identifier according to the first public key.

$enc(pk_1, key_{first\ distribution})$ is generated in the foregoing step. To ensure data security, in this method, an information set may be written to the blockchain. Therefore, to enable the first distributor to conveniently find enc(pk$_1$, key$_{first\ distribution}$), a key query identifier, that is, the first distribution key query identifier, may be unidirectionally generated for the distributor, which may be represented by hash(pk$_1$), so that the first distributor may read enc(pk$_1$, key$_{first\ distribution}$) from the blockchain by using pk$_1$.

At step 312, the method may write a production information set to a blockchain, where the production information set includes the first distribution key query identifier, the production information query identifier, the first distribution key encryption data, and the production information encryption data.

In this step, the production information may be written to the blockchain (linking to the chain), so that the distributor and the buyer may obtain enc(pk$_1$, key$_{first\ distribution}$) and enc(key$_{production\ encryption}$, m$_{production}$), which may be found by using hash(pk$_1$) and hash(key$_{first\ distribution}$).

Figure 8:
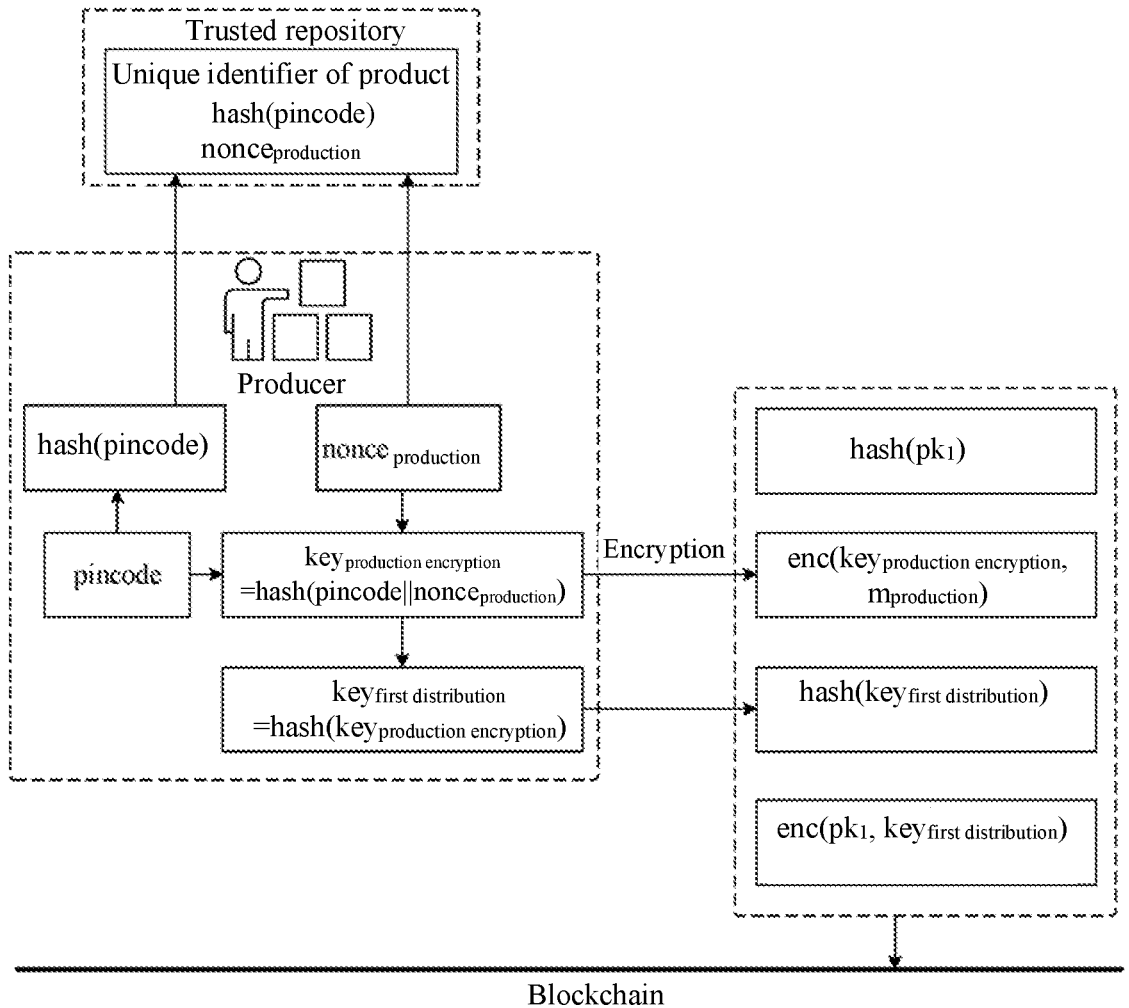
FIG. 8 is a schematic diagram of a blockchain-based method for encrypting product information, according to Embodiment 3.

In some embodiments, to further enhance the privacy, this step may include: signing the production information set according to a production private key, where the production private key is a private key generated by the producer when the producer produces the product; and writing the signed production information set to the blockchain. FIG. 8 is a schematic diagram of an implementation of this method.

With the method provided in Embodiment 3, based on Embodiment 1, the first distribution key for distribution to the first distributor is unidirectionally generated according to the production encryption key, and then the production information query identifier is unidirectionally generated. The first distribution key is encrypted according to the first public key to generate the first distribution key encryption data. The first distribution key query identifier is unidirectionally generated according to the first public key. The production information set including the first distribution key query identifier, the production information query identifier, the first distribution key encryption data, and the production information encryption data may be written to the blockchain. The production information is encrypted based on characteristics that the unique secret code of the product is accessible only when the buyer destroys the integrity of the product and the blockchain is tamper-proof and forgery-proof, so that the production information is highly confidential. In addition, the production information may be written to the blockchain, so that a next distributor may write product information to the blockchain through successive encryption along the chain.

Embodiment 4

Figure 9:
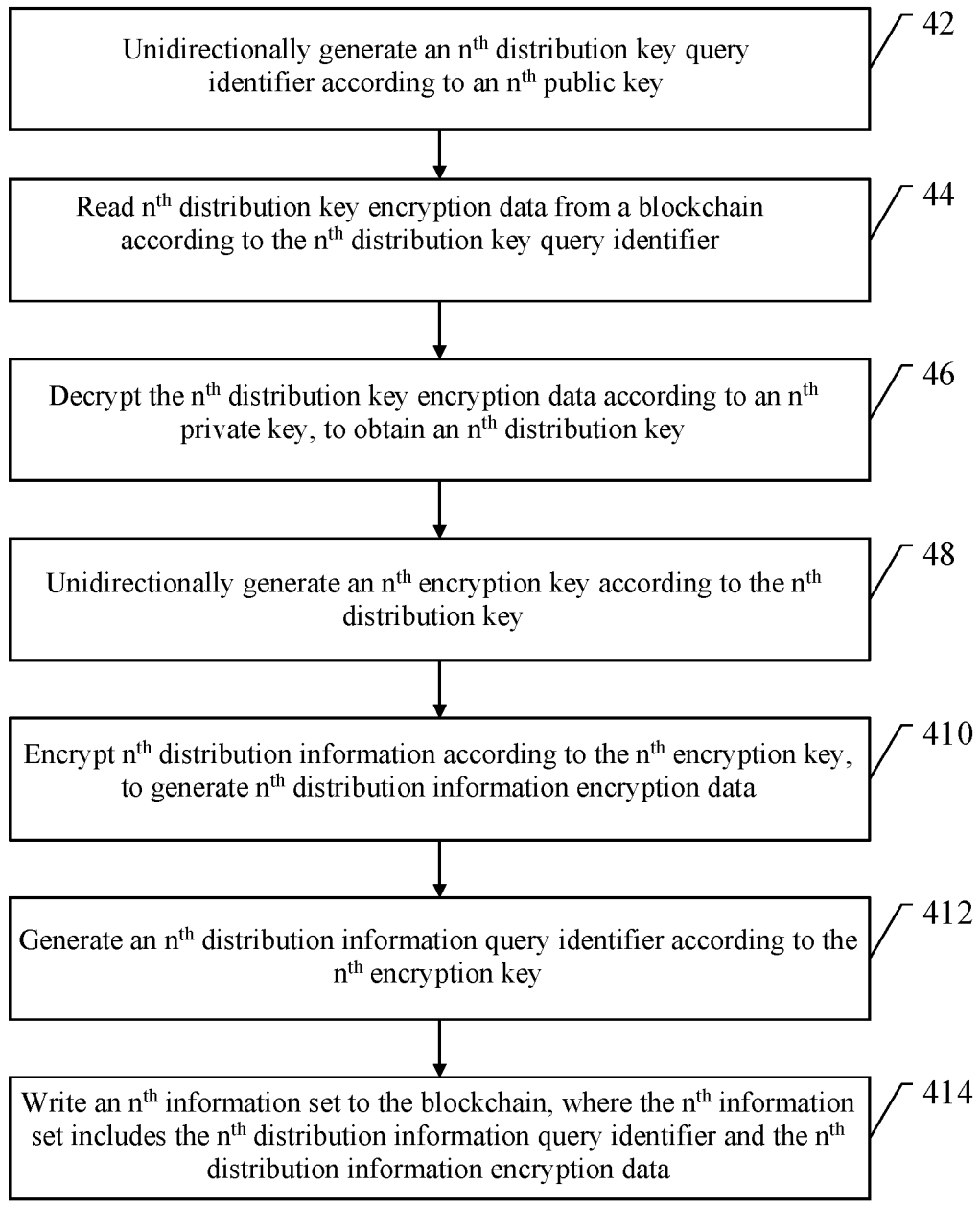
FIG. 9 is a schematic flowchart of a blockchain-based method for encrypting product information, according to Embodiment 4.

This embodiment describes a blockchain-based method for encrypting and decrypting product information by using an example that a producer, a distributor, and a buyer are present in a distribution process. Specifically, a blockchain-based method for encrypting product information is described, which is applied to the distributor of the present producer, distributor, and buyer. A procedure of the method is shown in FIG. 9, and includes the following steps.

At step 42, the method may unidirectionally generate an $n^{th}$ distribution key query identifier according to an $n^{th}$ public key.

A function of a public key of a distributor is described in Embodiment 3. In this step, an $n^{th}$ distribution key query identifier hash(pkn) may be unidirectionally generated according to pkn. n may be a natural number greater than 0, for example, 1, 2, 3, 4 . . . .

At step 44, the method may read $n^{th}$ distribution key encryption data from a blockchain according to the $n^{th}$ distribution key query identifier.

As shown in FIG. 8, when a production information set may be written to the blockchain, a first distributor may find enc(pk$_1$, key$_{first\ distribution}$) according to hash(pk$_1$), and similarly, an $n^{th}$ distributor may find enc(pkn, key$_n^{th}{}_{distribution}$) according to hash(pkn).

As described in Embodiment 3, in some embodiments, the production information set may be signed. However, a plurality of distributors may be present, and each distributor signs with a respective private key. Therefore, after this step, the method may further include: performing signature verification on a signed production information set according to a production public key; or perform signature verification on a signed $n^{th}$ information set according to the $n^{th}$ public key. The next step may be performed after verification succeeds.

A step 46, the method may decrypt the $n^{th}$ distribution key encryption data according to an $n^{th}$ private key, to obtain an $n^{th}$ distribution key.

As described in Embodiment 3, the first distributor may decrypt enc(pk$_1$, key$_{first\ distribution}$) according to the first private key ski, and similarly, in this step, enc(pkn, key$_n^{th}{}_{distribution}$) may be decrypted according to the $n^{th}$ private key sk$_n$.

At step 48, the method may unidirectionally generate an $n^{th}$ encryption key according to the $n^{th}$ distribution key.

As described in Embodiment 3 (reference may be made to Embodiment 1), key$_{production\ encryption}$ is unidirectionally generated according to pincode of the product, and the distributor may not obtain pincode. In the encryption method provided in the present specification, encryption keys may be generated according to pincode successively along the chain. Therefore, in this step, the distributor may unidirectionally generate key$_n^{th}{}_{encryption}$ according to key$_n^{th}{}_{distribution}$, to be associated with the producer. To be specific, the producer generates key$_{production\ encryption}$ according to pincode, and distributors generate key$_{first\ encryption}$, key$_{second\ encryption}$, key$_{third\ encryption}$, and so on successively along the chain, that is, key$_n^{th}{}_{encryption}$=hash(key$_n^{th}{}_{distribution}$).

In some embodiments, to further enhance the privacy, the distributor may generate a random number (similar to the producer). Therefore, this step may include: receive an $n^{th}$ random number that is generated by an $n^{th}$ distributor when the $n^{th}$ distributor receives the product; and unidirectionally generating the $n^{th}$ encryption key according to a combination of the $n^{th}$ distribution key and the $n^{th}$ random number. Specifically, there may be key$_n^{th}{}_{encryption}$=hash(key$_n^{th}{}_{distribution}$||noncen$^{th}$).

Similar to that in Embodiment 1, this step may further include: sending the $n^{th}$ random number to a trusted repository, where the $n^{th}$ random number is associated with a unique identifier of the product, so that the buyer may find a random number of each distributor by using the unique identifier of the product, while the distributor may not obtain a random number of another distributor because the distributor may not obtain pincode.

At step 410, the method may encrypt $n^{th}$ distribution information according to the $n^{th}$ encryption key, to generate $n^{th}$ distribution information encryption data.

The producer may generate a piece of production information m$_{production}$, and each distributor may generate respective distribution information m$_n^{th}$ in the distribution process. For example, the first distributor may generate m$_{first}$, the second distributor may generate m$_{second}$, and so on. Therefore, in this step, $m_n^{th}$ may be encrypted according to $key_n^{th}{}_{encryption}$, to generate $enc(key_n^{th}{}_{encryption}, m_n^{th})$.

At step 412, the method may generate an $n^{th}$ distribution information query identifier according to the $n^{th}$ encryption key.

A manner of generating an information query identifier is described in Embodiment 1. In this step, the $n^{th}$ distribution information query identifier may also be generated by using $key_n^{th}$ encryption in the manner described in Embodiment 1.

In some embodiments, a next distributor may be present. Similar to step 36 in Embodiment 3, this step may further include: unidirectionally generating an $(n+1)^{th}$ distribution key according to the $n^{th}$ encryption key, and unidirectionally generating the $n^{th}$ distribution information query identifier according to the $(n+1)^{th}$ distribution key. The $(n+1)^{th}$ distribution key may be corresponding to a next distributor relative to the $n^{th}$ distributor. That is, $key_{(n+1)}^{th}{}_{distribution}=hash(key_n^{th}{}_{distribution})$, and the $n^{th}$ distribution information query identifier may be $hash(key_{(n+1)}^{th}{}_{distribution})$, so that the $(n+1)^{th}$ distributor may read data from the blockchain according to $hash(key_{(n+1)}^{th}{}_{distribution})$.

At step 414, the method may write an $n^{th}$ information set to the blockchain, where the $n^{th}$ information set includes the $n^{th}$ distribution information query identifier and the $n^{th}$ distribution information encryption data.

Similar to that in FIG. 2 or FIG. 3, in this step, the $n^{th}$ information set including the $n^{th}$ distribution information query identifier and $enc(key_n^{th}$ encryption, $m_n^{th})$ may be written to the blockchain.

When a next distributor is present, this step may include: encrypting the $(n+1)^{th}$ distribution key according to an $(n+1)^{th}$ public key, to generate $(n+1)^{th}$ distribution key encryption data, where the $(n+1)^{th}$ public key may be a distribution public key of an $(n+1)^{th}$ distributor; unidirectionally generating an $(n+1)^{th}$ distribution key query identifier according to the $(n+1)^{th}$ public key; and writing an $n^{th}$ information set to the blockchain, where the $n^{th}$ information set includes the $(n+1)^{th}$ distribution key query identifier, the $n^{th}$ distribution information query identifier, the $(n+1)^{th}$ distribution key encryption data, and the $n^{th}$ distribution information encryption data.

Specifically, similar to that in the foregoing description, $key_{(n+1)}^{th}{}_{distribution}$ may be encrypted according to $pk_{n+1}$ to generate $enc(pk_{n+1}, key_{(n+1)}^{th}{}_{distribution})$, and $hash(pk_{n+1})$ is generated as an $(n+1)^{th}$ distribution key query identifier. The $n^{th}$ information set including $hash(pk_{n+1})$, $hash(key_{(n+1)}^{th}{}_{distribution})$, $enc(pk_{n+1}, key_{(n+1)}^{th}{}_{distribution})$, and $enc(key_n^{th}{}_{encryption}, m_n^{th})$ may be written to the blockchain.

In some embodiments, the encrypting the $(n+1)^{th}$ distribution key according to an $(n+1)^{th}$ public key, to generate $(n+1)^{th}$ distribution key encryption data may include: encrypting a combination of a plain code of the product and the $(n+1)^{th}$ distribution key according to the $(n+1)^{th}$ public key, to generate the $(n+1)^{th}$ distribution key encryption data. That is, there may be $enc(pk_{n+1}, qcode\|key_{(n+1)}^{th}{}_{distribution})$.

Figure 10:
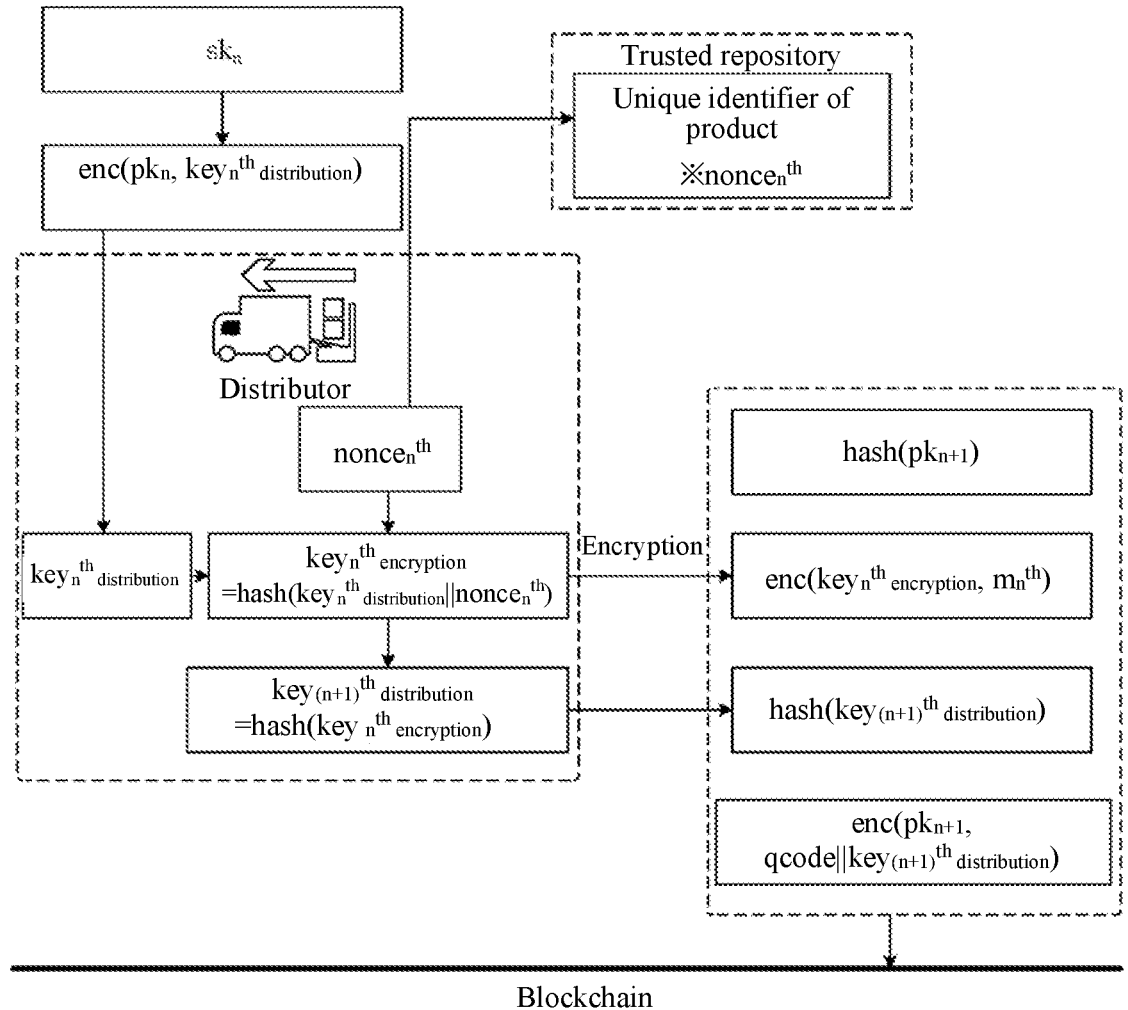
FIG. 10 is a schematic diagram of a blockchain-based method for encrypting product information, according to Embodiment 4.

In some embodiments, similar to that in the foregoing description, the $n^{th}$ information set may be signed according to the $n^{th}$ private key; and the signed $n^{th}$ information set may be written to the blockchain, so that a next distributor may perform signature verification according to the public key. FIG. 10 is a schematic diagram of this embodiment.

With the method in Embodiment 4, based on the producer in Embodiment 3, the $n^{th}$ distribution key may be obtained through parsing according to the $n^{th}$ private key, and the $n^{th}$ information set including the $(n+1)^{th}$ distribution key query identifier, the $n^{th}$ distribution information query identifier, the $(n+1)^{th}$ distribution key encryption data, and the $n^{th}$ distribution information encryption data may be written to the blockchain. The $n^{th}$ distribution information is encrypted based on characteristics that the unique secret code of the product is accessible only when the buyer destroys the integrity of the product and the blockchain is tamper-proof and forgery-proof, so that the $n^{th}$ distribution information is highly confidential. In addition, the $n^{th}$ distribution information may be written to the blockchain, so that a next distributor may write product information to the blockchain through successive encryption along the chain. If the next distributor is not present, the $n^{th}$ information set including the $n^{th}$ distribution information query identifier and the $n^{th}$ distribution information encryption data may alternatively be written to the blockchain.

Embodiment 5

Figure 11:
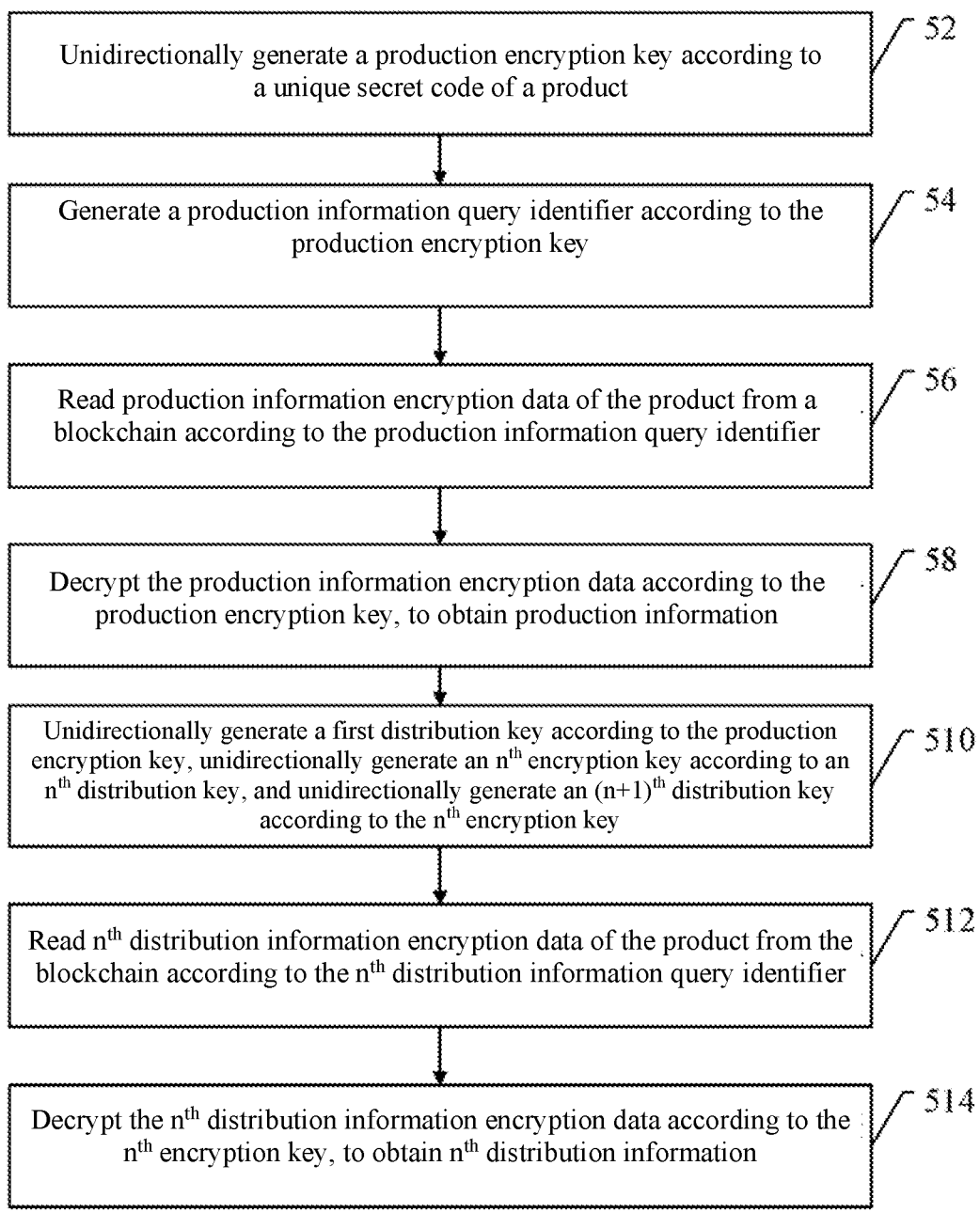
FIG. 11 is a schematic flowchart of a blockchain-based method for decrypting product information, according to Embodiment 5.

This embodiment describes a blockchain-based method for encrypting and decrypting product information by using an example that a producer, a distributor, and a buyer are present in a distribution process. Specifically, a blockchain-based method for decrypting product information is described, which is applied to the buyer of the present producer, distributor, and buyer. A procedure of the method is shown in FIG. 11, and includes the following steps.

At step 52, the method may unidirectionally generate a production encryption key according to a unique secret code of a product.

At step 54, the method may generate a production information query identifier according to the production encryption key.

At step 56, the method may read production information encryption data of the product from a blockchain according to the production information query identifier.

In some embodiments, this step may include: unidirectionally generating the production encryption key according to a combination of the unique secret code and a production random number, unidirectionally generating a first distribution key, and unidirectionally generating the production information query identifier; and reading the production information encryption data in a production information set from the blockchain according to the production information query identifier.

Specifically, in this step, a random number may be introduced. That is, there may be $key_{production\ encryption}=hash(pincode\ nonce_{production})$. $key_{first\ distribution}=hash(key_{production\ encryption})$, and a production information query identifier $hash(key_{first\ distribution})$ may be unidirectionally generated, so that $enc(key_{production\ encryption}, m_{production})$ in a production information set may be read from the blockchain.

At step 58, the method may decrypt the production information encryption data according to the production encryption key, to obtain production information.

The step is similar to the implementation described in Embodiment 2. Details are not described herein again.

At step 510, the method may unidirectionally generate a first distribution key according to the production encryption key, unidirectionally generate an $n^{th}$ encryption key according to an $n^{th}$ distribution key, and unidirectionally generate an $(n+1)^{th}$ distribution key according to the $n^{th}$ encryption key.

The buyer may unidirectionally generate $key_{first\ distribution}$ according to $key_{production\ encryption}$. That is, $key_{first\ distribution}=hash(key_{production\ encryption})$. $key_n^{th}{}_{encryption}$ may be generated according to $key_n^{th}{}_{distribution}$ through successive generation along the chain. As described above, a random number may be introduced when an encryption key is generated. Therefore, the unidirectionally generating an $n^{th}$ encryption key according to an $n^{th}$ distribution key may include: obtaining an $n^{th}$ random number corresponding to an $n^{th}$ random number query identifier from a trusted repository; and unidirectionally generating the $n^{th}$ encryption key according to a combination of the $n^{th}$ distribution key and the $n^{th}$ random number. Specifically, because the buyer obtains pincode, a random number query identifier hash(pincode) may be unidirectionally generated. According to the description in the foregoing embodiment, the producer and the distributor both may send a random number to the trusted repository, where the random number may be associated with a unique identifier of the product, that is, the unique identifier may be associated with hash(pincode), the production random number, and the $n^{th}$ random number. In this case, the trusted repository may be configured to allow associating a random number with the unique identifier, disallow reading the random number through the unique identifier, and allow reading the random number through hash(pincode). It may effectively prevent the distributor from obtaining the random number by using the unique identifier. After obtaining the corresponding $n^{th}$ random number (including a first random number, a second random number, . . . , and an $n^{th}$ random number) by using hash(pincode), the buyer may unidirectionally generate the $n^{th}$ encryption key, and there may be $key_{n\ encryption}^{th}=hash(key_{n\ distribution}^{th}\|noncen^{th})$. For the distribution key, the $(n+1)^{th}$ distribution key may be unidirectionally generated according to the $n^{th}$ encryption key, and there may be $key_{(n+1)\ distribution}^{th}=hash(key_{n\ encryption}^{th})$. Specifically, for example, the buyer generates $key_{production\ encryption}$ in step 52; then in this step, there may be $key_{first\ distribution}=hash(key_{production\ encryption})$, $key_{first\ encryption}=hash(key_{first\ distribution}\|nonce_{first})$, and $key_{second\ distribution}=hash(key_{first\ encryption})$. In this way, distribution keys of all distributors may be obtained. In some embodiment, n may be a natural number greater than 0.

At step 512, the method may read $n^{th}$ distribution information encryption data of the product from the blockchain according to an $n^{th}$ distribution information query identifier.

For a last distributor, the $n^{th}$ distribution information query identifier may be generated according to the $n^{th}$ encryption key in a preset manner, for example, in the manner described in step 18 in Embodiment 1 (e.g., generated according to a specific quantity of bits in $key_n^{th}$ encryption, or generated according to a combination of the specific quantity of bits and a one-way function, or the $n^{th}$ distribution information query identifier is generated by performing one-way calculation twice).

For a non-last distributor, this step may include: unidirectionally generating the $n^{th}$ encryption key according to a combination of the $n^{th}$ distribution key and the $n^{th}$ random number, unidirectionally generating the $(n+1)^{th}$ distribution key, and unidirectionally generating the $n^{th}$ distribution information query identifier; and reading enc($key_n^{th}$ encryption, $m_n^{th}$) in an $n^{th}$ information set from the blockchain according to the $n^{th}$ distribution information query identifier.

Specifically, there may be $key_{n\ encryption}^{th}=hash(key_{n\ distribution}^{th}\|noncen^{th})$ and $key_{(n+1)\ distribution}^{th}=hash(key_{n\ encryption}^{th})$. Then, an $n^{th}$ distribution information query identifier hash($key_{(n+1)\ distribution}^{th}$) may be generated. As shown in FIG. 10, enc($key_{n\ encryption}^{th}$, $m_n^{th}$) may be read from the blockchain according to hash($key_{(n+1)\ distribution}^{th}$).

At step 514, the method may decrypt the $n^{th}$ distribution information encryption data according to the $n^{th}$ encryption key, to obtain $n^{th}$ distribution information.

Figure 12:
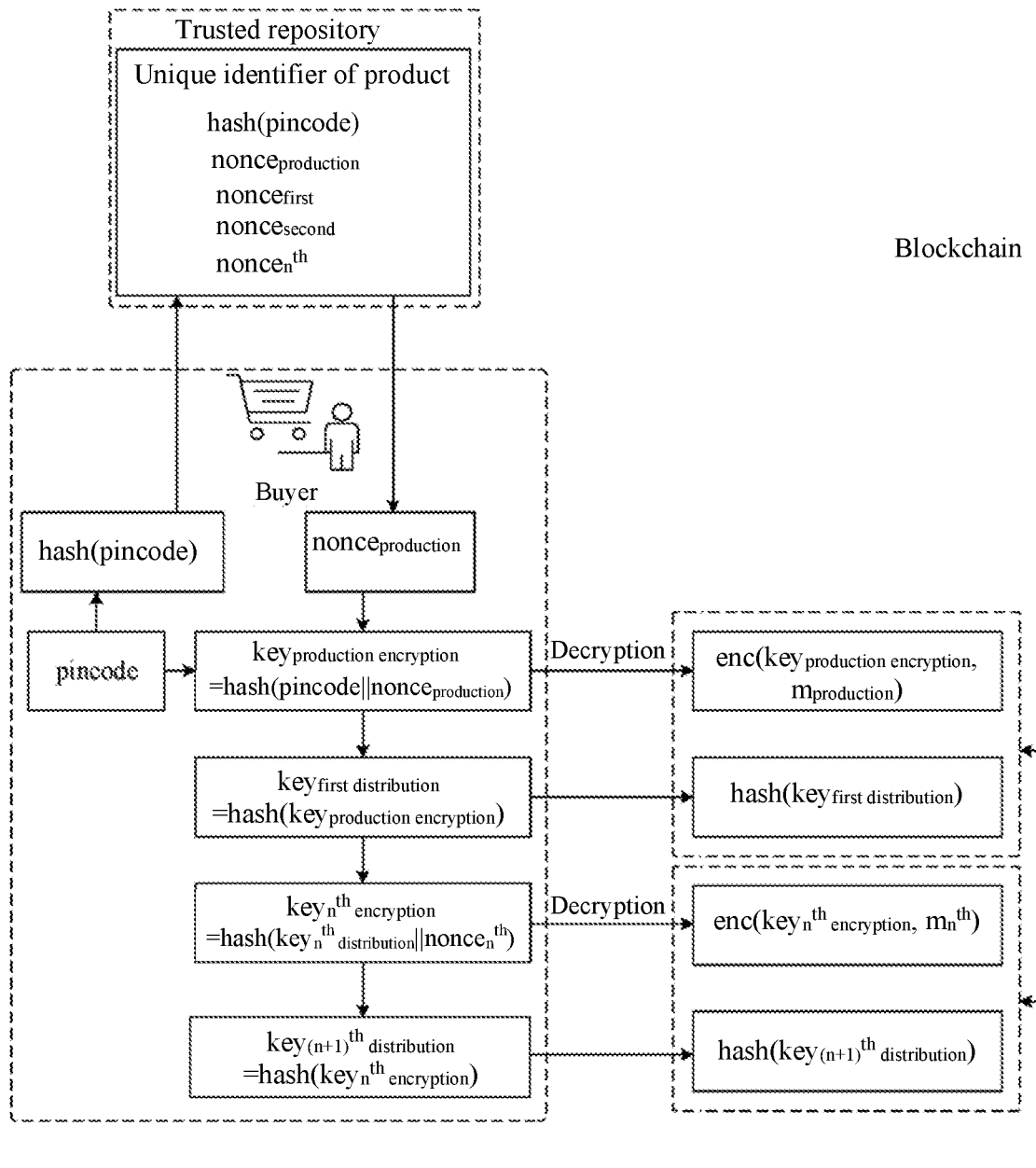
FIG. 12 is a schematic diagram of a blockchain-based method for decrypting product information, according to Embodiment 5.

Specifically, similar to the description in Embodiment 2, enc($key_{n\ encryption}^{th}$, $m_n^{th}$) may be decrypted according to $key_{n\ encryption}^{th}$, to obtain $m_n^{th}$. FIG. 12 is a schematic diagram of this embodiment.

With the method provided in Embodiment 5, the buyer unidirectionally generates the production encryption key by using the unique secret code of the product, then generates the production information query identifier according to the production encryption key, and decrypts the production information encryption data that is read from the blockchain, to obtain the production information. Through successive encryption along the chain, the first distribution key is generated according to the production encryption key, then the first encryption key is generated, generation is continued until the $n^{th}$ encryption key is generated, and then the $(n+1)^{th}$ distribution key and the $n^{th}$ information query identifier are generated. Further, the $n^{th}$ distribution information encryption data obtained according to the $n^{th}$ information query identifier is decrypted according to the $n^{th}$ encryption key, to obtain the $n^{th}$ distribution information.

Embodiment 6

Figure 13:
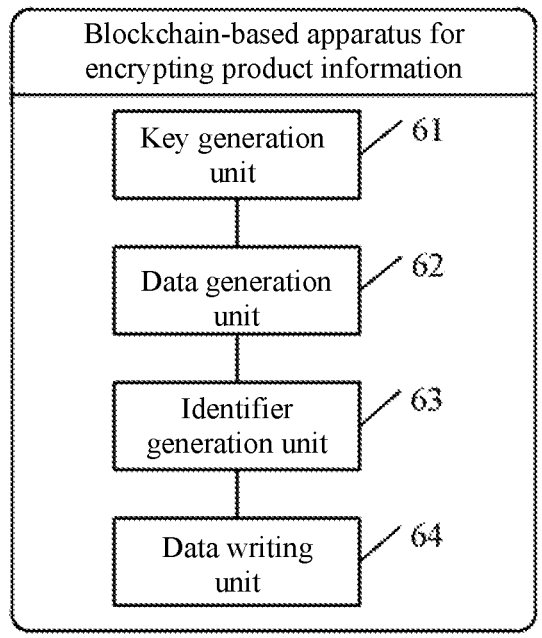
FIG. 13 is a schematic structural diagram of a blockchain-based apparatus for encrypting product information, according to Embodiment 6.

Embodiment 6 provides a blockchain-based apparatus for encrypting product information. The apparatus may be applied to a producer, to implement the method in Embodiment 1 and Embodiment 3. A structural block diagram of the apparatus is shown in FIG. 13, and includes: a key generation unit 61, a data generation unit 62, an identifier generation unit 63, and a data writing unit 64.

The key generation unit 61 may unidirectionally generate a production encryption key according to a unique secret code of a product. The data generation unit 62 may encrypt production information of the product according to the production encryption key, to generate production information encryption data. The identifier generation unit 63 may generate a production information query identifier according to the production encryption key. The data transmission unit 64 may write a production information set to a blockchain, where the production information set includes the production information query identifier and the production information encryption data.

In some embodiments, the key generation unit 61 may receive a production random number that is generated by the producer when the producer produces the product; and unidirectionally generate the production encryption key according to a combination of the unique secret code and the production random number.

In some embodiments, the data generation unit 63 may unidirectionally generate a random number query identifier according to the unique secret code; and the data transmission unit 64 may create a unique identifier for the product in a trusted repository; and send the random number query identifier and the production random number to the trusted repository, where the random number query identifier and the production random number are associated with the unique identifier.

In some embodiments, the identifier generation unit 63 may unidirectionally generate a first distribution key according to the production encryption key, and unidirectionally generate the production information query identifier according to the first distribution key; the data generation unit 62 may encrypt the first distribution key according to a first public key, to generate first distribution key encryption data, where the first public key is a distribution public key of a first distributor; and unidirectionally generate a first distribution key query identifier according to the first public key;

and the data transmission unit 64 may write a production information set to the blockchain, where the production information set includes the first distribution key query identifier, the production information query identifier, the first distribution key encryption data, and the production information encryption data.

In some embodiments, the data generation unit 62 may encrypt a combination of a plain code of the product and the first distribution key according to the first public key, to generate the first distribution key encryption data.

In some embodiments, the data transmission unit 64 may sign the production information set according to a production private key, where the production private key is a private key generated by the producer when the producer produces the product; and write the signed production information set to the blockchain.

Embodiment 7

Figure 14:
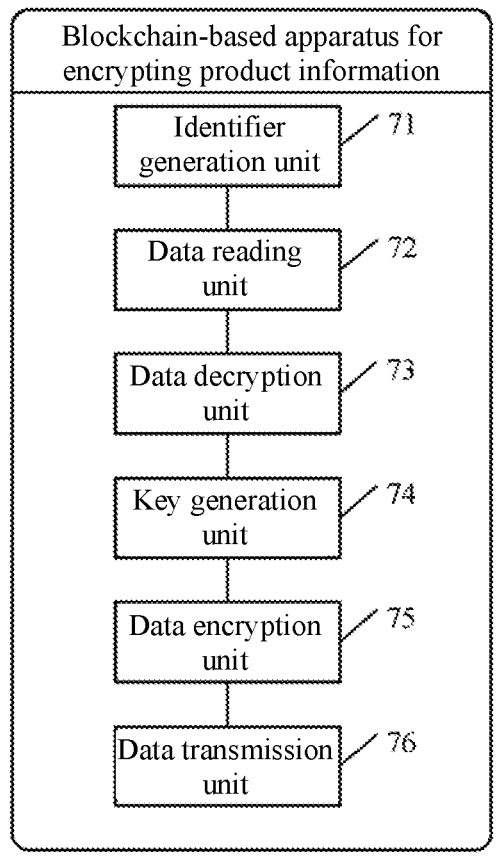
FIG. 14 is a schematic structural diagram of a blockchain-based apparatus for encrypting product information, according to Embodiment 7.

Embodiment 7 provides a blockchain-based apparatus for encrypting product information. The apparatus may be applied to a distributor, to implement the method in Embodiment 4. A structural block diagram of the apparatus is shown in FIG. 14, and includes: an identifier generation unit 71, a data reading unit 72, a data parsing unit 73, a key generation unit 74, a data encryption unit 75, and a data transmission unit 76.

The identifier generation unit 71 may unidirectionally generate an $n^{th}$ distribution key query identifier according to an $n^{th}$ public key. The data reading unit 72 may read $n^{th}$ distribution key encryption data from a blockchain according to the $n^{th}$ distribution key query identifier. The data parsing unit 73 may decrypt the $n^{th}$ distribution key encryption data according to an $n^{th}$ private key, to obtain an $n^{th}$ distribution key. The key generation unit 74 may unidirectionally generate an $n^{th}$ encryption key according to the $n^{th}$ distribution key. The data encryption unit 75 may encrypt $n^{th}$ distribution information according to the $n^{th}$ encryption key, to generate $n^{th}$ distribution information encryption data; and generate an $n^{th}$ distribution information query identifier according to the $n^{th}$ encryption key.

The data transmission unit 76 may write an $n^{th}$ information set to the blockchain, where the $n^{th}$ information set includes the $n^{th}$ distribution information query identifier and the $n^{th}$ distribution information encryption data. n may be a natural number greater than 0.

In some embodiments, the key generation unit 74 may receive an $n^{th}$ random number that is generated by an $n^{th}$ distributor when the $n^{th}$ distributor receives a product; and unidirectionally generate the $n^{th}$ encryption key according to a combination of the $n^{th}$ distribution key and the $n^{th}$ random number.

In some embodiments, the data transmission unit 76 may send the $n^{th}$ random number to a trusted repository, where the $n^{th}$ random number is associated with a unique identifier of the product.

In some embodiments, the identifier generation unit 71 may unidirectionally generate an $(n+1)^{th}$ distribution key according to the $n^{th}$ encryption key, and unidirectionally generating the $n^{th}$ distribution information query identifier according to the $(n+1)^{th}$ distribution key; the key generation unit 74 may encrypt the $(n+1)^{th}$ distribution key according to an $(n+1)^{th}$ public key, to generate $(n+1)^{th}$ distribution key encryption data, where the $(n+1)^{th}$ public key is a distribution public key of an $(n+1)^{th}$ distributor; the identifier generation unit 71 may unidirectionally generate an $(n+1)^{th}$ distribution key query identifier according to the $(n+1)^{th}$ public key; and the data transmission unit 76 may write an $n^{th}$ information set to the blockchain, where the $n^{th}$ information set includes the $(n+1)^{th}$ distribution key query identifier, the $n^{th}$ distribution information query identifier, the $(n+1)^{th}$ distribution key encryption data, and the $n^{th}$ distribution information encryption data.

In some embodiments, the data encryption unit 75 may encrypt a combination of a plain code of the product and the $(n+1)^{th}$ distribution key according to the $(n+1)^{th}$ public key, to generate the $(n+1)^{th}$ distribution key encryption data.

In some embodiments, the data transmission unit 76 may sign the $n^{th}$ information set according to the $n^{th}$ private key; and write the signed $n^{th}$ information set to the blockchain.

In some embodiments, before decrypting the $n^{th}$ distribution key encryption data according to the $n^{th}$ private key, the data parsing unit 73 may perform signature verification on a signed production information set according to a production public key; or perform signature verification on a signed $n^{th}$ information set according to the $n^{th}$ public key.

Embodiment 8

Figure 15:
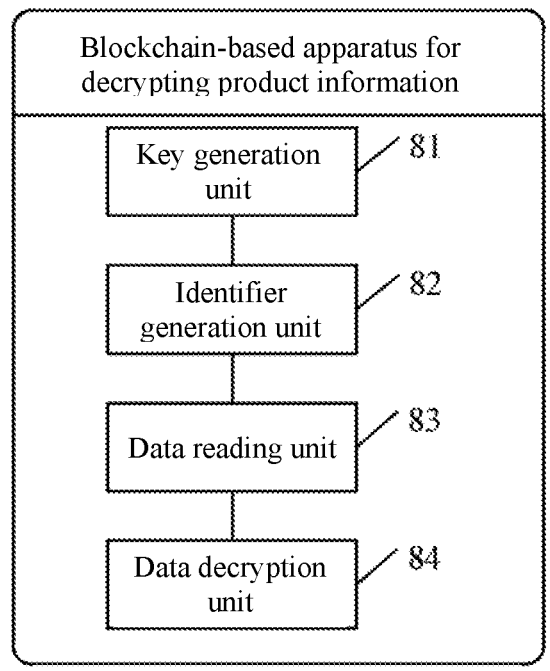
FIG. 15 is a schematic structural diagram of a blockchain-based apparatus for decrypting product information, according to Embodiment 8.

Embodiment 8 provides a blockchain-based apparatus for decrypting product information. The apparatus may be applied to a buyer, to implement the method in Embodiments 2 and 5. A structural block diagram of the apparatus is shown in FIG. 15, and includes: a key generation unit 81, an identifier generation unit 82, a data reading unit 83, and a data parsing unit 84.

The key generation unit 81 may unidirectionally generate a production encryption key according to a unique secret code of a product. The identifier generation unit 82 may generate a production information query identifier according to the production encryption key. The data reading unit 83 may read production information encryption data of the product from a blockchain according to the production information query identifier. The data parsing unit 84 may decrypt the production information encryption data according to the production encryption key, to obtain production information.

In some embodiments, the key generation unit 81 may unidirectionally generate a first distribution key according to the production encryption key, unidirectionally generate an $n^{th}$ encryption key according to the $n^{th}$ distribution key, and unidirectionally generate an $(n+1)^{th}$ distribution key according to the $n^{th}$ encryption key; the data reading unit 83 may read $n^{th}$ distribution information encryption data of the product from the blockchain according to the $n^{th}$ distribution information query identifier; and the data parsing unit 84 may decrypt the $n^{th}$ distribution information encryption data according to the $n^{th}$ encryption key, to obtain $n^{th}$ distribution information, where n may be a natural number greater than 0.

In some embodiments, the key generation unit 81 may unidirectionally generate a random number query identifier according to the unique secret code of the product; the data reading unit 83 may obtain a production random number corresponding to the random number query identifier from a trusted repository; and the key generation unit 81 may unidirectionally generate the production encryption key according to a combination of the unique secret code and the production random number.

In some embodiments, the data reading unit 83 may obtain an $n^{th}$ random number corresponding to an $n^{th}$ random number query identifier from a trusted repository; and the key generation unit 81 may unidirectionally generate the $n^{th}$ encryption key according to a combination of the $n^{th}$ distribution key and the $n^{th}$ random number, where n may be a natural number greater than 0.

In some embodiments, the key generation unit 81 may unidirectionally generate the production encryption key according to a combination of the unique secret code and the production random number, unidirectionally generate the first distribution key, and unidirectionally generate the production information query identifier; the data reading unit 83 may read the production information encryption data in a production information set from the blockchain according to the production information query identifier; the key generation unit 81 may unidirectionally generate the $n^{th}$ encryption key according to a combination of the $n^{th}$ distribution key and the $n^{th}$ random number, unidirectionally generate the $(n+1)^{th}$ distribution key, and unidirectionally generate the $n^{th}$ distribution information query identifier; and the data reading unit 83 may read the $n^{th}$ distribution information encryption data in an $n^{th}$ information set from the blockchain according to the $n^{th}$ distribution information query identifier.

Figure 16:
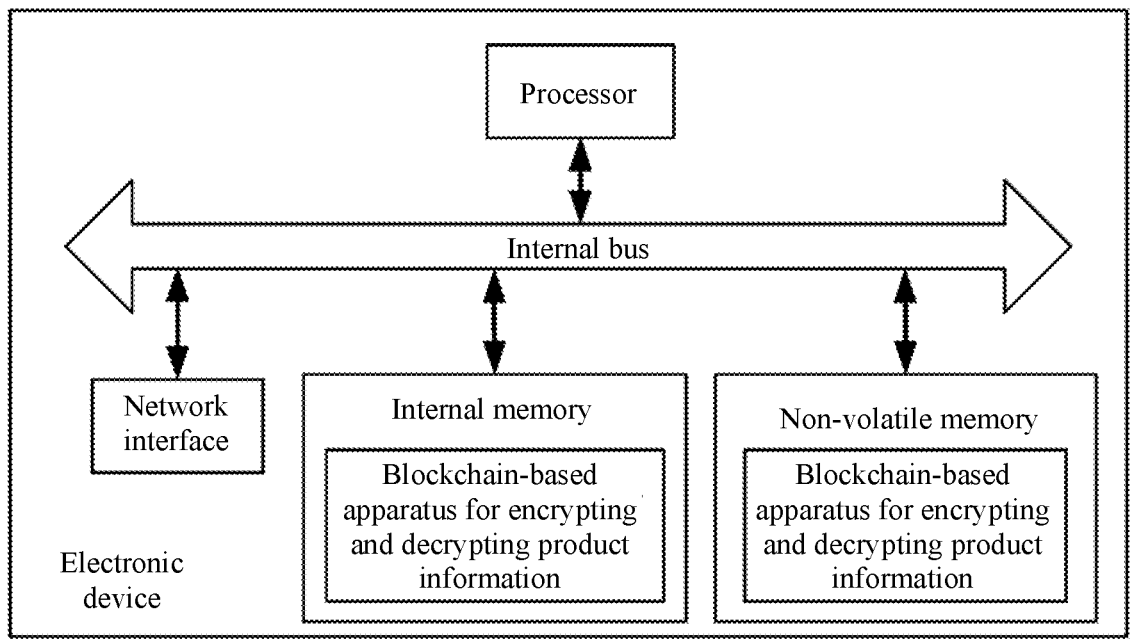
FIG. 16 is a schematic structural diagram of an electronic device, according to an embodiment of the present specification.

FIG. 16 is a schematic structural diagram of an electronic device, according to an embodiment of the present specification. In terms of hardware, the electronic device includes a processor, and optionally further includes an internal bus, a network interface, and a memory. The memory may include an internal memory, such as a high-speed random-access memory (RAM), and may also include a non-volatile memory, such as at least one disk storage. Certainly, the electronic device may also include other hardware necessary to services.

The processor, the network interface, and the memory may be connected to each other by using the internal bus. The internal bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus is represented only by a double-sided arrow in FIG. 16, but it does not mean that there is only one bus or one type of bus.

The memory is configured to store a program. Specifically, the program may include program code, and the program code includes a computer operation instruction. The memory may include an internal memory and a non-volatile memory, and provides an instruction and data to the processor.

The processor reads the corresponding computer program from the non-volatile memory, loads the computer program to the internal memory, and then runs the computer program, to logically form a blockchain-based apparatus for encrypting and decrypting product information. The processor executes the program stored in the memory, and is configured to perform the following operations: unidirectionally generating a production encryption key according to a unique secret code of a product; encrypting production information of the product according to the production encryption key, to generate production information encryption data; generating a production information query identifier according to the production encryption key; and writing a production information set to a blockchain, where the production information set includes the production information query identifier and the production information encryption data.

The processor may be further configured to perform the following operations: unidirectionally generating an $n^{th}$ distribution key query identifier according to an $n^{th}$ public key; reading $n^{th}$ distribution key encryption data from a blockchain according to the $n^{th}$ distribution key query identifier; decrypting the $n^{th}$ distribution key encryption data according to an $n^{th}$ private key, to obtain an $n^{th}$ distribution key; unidirectionally generating an $n^{th}$ encryption key according to the $n^{th}$ distribution key; encrypting $n^{th}$ distribution information according to the $n^{th}$ encryption key, to generate $n^{th}$ distribution information encryption data; generating an $n^{th}$ distribution information query identifier according to the $n^{th}$ encryption key; and writing an $n^{th}$ information set to the blockchain, where the $n^{th}$ information set includes the $n^{th}$ distribution information query identifier and the $n^{th}$ distribution information encryption data, where n may be a natural number greater than 0.

The processor may be further configured to perform the following operations: unidirectionally generating a production encryption key according to a unique secret code of a product; generating a production information query identifier according to the production encryption key; reading production information encryption data of the product from a blockchain according to the production information query identifier; and decrypting the production information encryption data according to the production encryption key, to obtain production information.

The method executed by the blockchain-based apparatus for encrypting and decrypting product information provided in the embodiment shown in FIG. 16 of the present specification may be applied to the processor, or implemented by the processor. The processor may be an integrated circuit chip and has a signal processing capability. In some embodiments process, the steps of the foregoing method may be implemented by using a hardware integrated logic circuit in the processor or instructions in a form of software. The processor may be a general-purpose processor, including a central processing unit (CPU), a network processor (NP), and the like; or may be a digital signal processor (DSP), an application-specific integrated circuit (ASIC), a field-programmable gate array (FPGA), or another programmable logic device, discrete gate or transistor logic device, or discrete hardware component. The processor may implement or execute methods, steps, and logical block diagrams disclosed in the embodiments of the present specification. The general-purpose processor may be a microprocessor, or the processor may be any conventional processor or the like. The steps in the methods disclosed in the embodiments of the present specification may be directly implemented by a hardware decoding processor, or may be implemented by a combination of hardware and software modules in a decoding processor. The software module may be located in a mature storage medium in the art, such as a RAM, a flash memory, a read-only memory (ROM), a programmable ROM, an electrically erasable programmable memory, or a register. The storage medium is located in the memory. The processor reads information in the memory, and completes the steps of the method by using hardware thereof.

The electronic device may further execute the methods executed by the blockchain-based apparatuses for encrypting and decrypting product information in FIG. 13 to FIG. 15, and implement functions of the blockchain-based apparatuses for encrypting and decrypting product information in the embodiment shown in FIG. 16. Details are not described herein again in this embodiment of the present specification.

An embodiment of the present specification further provides a computer readable storage medium. The computer readable storage medium stores one or more programs, the one or more programs include an instruction, and when the instruction is executed by an electronic device including a plurality of application programs, the electronic device may be enabled to execute the method executed by the blockchain-based apparatus for encrypting and decrypting product information in the embodiment shown in FIG. 16, and is configured to: unidirectionally generate a production encryption key according to a unique secret code of a product; encrypt production information of the product according to the production encryption key, to generate production information encryption data; generate a production information query identifier according to the production encryption key; and write a production information set to a blockchain, where the production information set includes the production information query identifier and the production information encryption data.

The electronic device may be further configured to: unidirectionally generate an $n^{th}$ distribution key query identifier according to an $n^{th}$ public key; read $n^{th}$ distribution key encryption data from a blockchain according to the $n^{th}$ distribution key query identifier; decrypt the $n^{th}$ distribution key encryption data according to an $n^{th}$ private key, to obtain an $n^{th}$ distribution key; unidirectionally generate an $n^{th}$ encryption key according to the $n^{th}$ distribution key; encrypt $n^{th}$ distribution information according to the $n^{th}$ encryption key, to generate $n^{th}$ distribution information encryption data; generate an $n^{th}$ distribution information query identifier according to the $n^{th}$ encryption key; and write an $n^{th}$ information set to the blockchain, where the $n^{th}$ information set includes the $n^{th}$ distribution information query identifier and the $n^{th}$ distribution information encryption data, where n may be a natural number greater than 0.

The electronic device may be further configured to: unidirectionally generate a production encryption key according to a unique secret code of a product; generate a production information query identifier according to the production encryption key; read production information encryption data of the product from a blockchain according to the production information query identifier; and decrypt the production information encryption data according to the production encryption key, to obtain production information.

The system, the apparatus, the module or the unit described in the foregoing embodiments may be implemented by a computer chip or an entity or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this specification, the function of the units may be implemented in a same piece of or multiple pieces of software and/or hardware.

A person skilled in the art should understand that the embodiments in this specification may be provided as a method, a system, or a computer program product. Therefore, the specification may use a form of hardware only embodiments, software only embodiments, or embodiments with a combination of software and hardware. Moreover, the specification may use a form of a computer program product that is implemented on one or more computer-usable storage media (including but not limited to a disk memory, a CD-ROM, an optical memory, and the like) that include computer-usable program code.

This specification is described with reference to the flowchart and/or block diagram of the method, device (system), and computer program product of the embodiments in this specification. It should be understood that computer program instructions may implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that may guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory. The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium may include a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device may access. Based on the definition in the present disclosure, the computer-readable medium does not include transitory computer readable media (transitory media), such as a modulated data signal and a carrier.

It should also be noted that the terms "include," "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments in this specification may be provided as a method, a system, or a computer program product. Therefore, the specification may use a form of hardware only embodiments, software only embodiments, or embodiments with a combination of software and hardware. Moreover, the specification may use a form of a computer program product that is implemented on one or more computer-usable storage media (including but not limited to a disk memory, a CD-ROM, an optical memory, and the like) that include computer-usable program code.

This specification may be described in the general context of computer-executable instructions executed by a computer, for example, a program module. Generally, the program module includes a routine, a program, an object, a component, a data structure, and the like for executing a particular task or implementing a particular abstract data type. This specification may also be practiced in distributed computing environments in which tasks are performed by remote processing devices that are connected by using a communications network. In a distributed computing environment, the program module may be located in both local and remote computer storage media including storage devices.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments in this specification and are not intended to limit this specification. For a person skilled in the art, various modifications and changes may be made to the specification. Any modification, equivalent replacement, or improvement made without departing from the spirit and principle of this specification shall fall within the scope of the claims of this specification.

What is claimed is:

1. A blockchain-based method for encrypting product information, comprising:
   unidirectionally generating a production encryption key according to a unique secret code of a product and a production random number;
   sending the production random number to a trusted repository, wherein the trusted repository can be queried according to the unique secret code to retrieve the production random number;
   encrypting production information of the product according to the generated production encryption key, to generate production information encryption data;
   generating a production information query identifier based on the unique secret code associated with the production encryption key; and
   writing a production information set to a blockchain, wherein the production information set comprises the generated production information query identifier and the generated production information encryption data.

2. The method according to claim 1, wherein
   the production random number is generated by a producer when the producer produces the product.

3. The method according to claim 1, wherein sending the production random number to the trusted repository comprises:
   unidirectionally generating a random number query identifier according to the unique secret code;
   creating a unique identifier for the product in the trusted repository; and
   sending the generated random number query identifier and the production random number to the trusted repository, wherein the random number query identifier and the production random number are associated with the unique identifier.

4. The method according to claim 1, wherein generating the production information query identifier based on the unique secret code associated with the production encryption key comprises:
   unidirectionally generating a first distribution key according to the production encryption key, and unidirectionally generating the production information query identifier according to the first distribution key; and
   the writing a production information set to a blockchain comprises:
   encrypting the first distribution key according to a first public key, to generate first distribution key encryption data, wherein the first public key is a distribution public key of a first distributor;
   unidirectionally generating a first distribution key query identifier according to the first public key; and
   writing a production information set to the blockchain, wherein the production information set comprises the first distribution key query identifier, the production information query identifier, the first distribution key encryption data, and the production information encryption data.

5. The method according to claim 4, wherein encrypting the first distribution key, according to the first public key, to generate first distribution key encryption data comprises:
   encrypting a combination of a plain code of the product and the first distribution key according to the first public key, to generate the first distribution key encryption data.

6. The method according to claim 4, wherein writing the production information set to the blockchain comprises:
   signing the production information set according to a production private key, wherein the production private key is a private key generated by a producer when the producer produces the product; and
   writing the signed production information set to the blockchain.

7. A blockchain-based method for encrypting product information, comprising:
   unidirectionally generating an $n^{th}$ distribution key query identifier according to an $n^{th}$ public key;
   reading $n^{th}$ distribution key encryption data from a blockchain according to the generated $n^{th}$ distribution key query identifier;
   decrypting the $n^{th}$ distribution key encryption data according to an $n^{th}$ private key, to obtain an $n^{th}$ distribution key;
   unidirectionally generating an $n^{th}$ encryption key based on at least the obtained $n^{th}$ distribution key;
   encrypting $n^{th}$ distribution information according to the $n^{th}$ encryption key, to generate $n^{th}$ distribution information encryption data;

generating an $n^{th}$ distribution information query identifier according to the $n^{th}$ encryption key; and writing an $n^{th}$ information set to the blockchain, wherein the $n^{th}$ information set comprises the $n^{th}$ distribution information query identifier and the $n^{th}$ distribution information encryption data, wherein n is a natural number greater than 0.

8. The method according to claim 7, wherein unidirectionally generating the $n^{th}$ encryption key based on at least the obtained $n^{th}$ distribution key comprises:

receiving an $n^{th}$ random number that is generated by an $n^{th}$ distributor when the $n^{th}$ distributor receives a product; and unidirectionally generating the $n^{th}$ encryption key according to a combination of the $n^{th}$ distribution key and the $n^{th}$ random number.

9. The method according to claim 8, further comprising:

sending the $n^{th}$ random number to a trusted repository, wherein the $n^{th}$ random number is associated with a unique identifier of the product.

10. The method according to claim 7, wherein generating the $n^{th}$ distribution information query identifier according to the $n^{th}$ encryption key comprises:

unidirectionally generating an $(n+1)^{th}$ distribution key according to the $n^{th}$ encryption key, and unidirectionally generating the $n^{th}$ distribution information query identifier according to the $(n+1)^{th}$ distribution key; and the writing an $n^{th}$ information set to the blockchain comprises:

encrypting the $(n+1)^{th}$ distribution key according to an $(n+1)^{th}$ public key, to generate $(n+1)^{th}$ distribution key encryption data, wherein the $(n+1)^{th}$ public key is a distribution public key of an $(n+1)^{th}$ distributor;

unidirectionally generating an $(n+1)^{th}$ distribution key query identifier according to the $(n+1)^{th}$ public key; and writing an $n^{th}$ information set to the blockchain, wherein the $n^{th}$ information set comprises the $(n+1)^{th}$ distribution key query identifier, the $n^{th}$ distribution information query identifier, the $(n+1)^{th}$ distribution key encryption data, and the $n^{th}$ distribution information encryption data.

11. The method according to claim 10, wherein encrypting the $(n+1)^{th}$ distribution key according to the $(n+1)^{th}$ public key, to generate the $(n+1)^{th}$ distribution key encryption data comprises:

encrypting a combination of a plain code of the product and the $(n+1)^{th}$ distribution key according to the $(n+1)^{th}$ public key, to generate the $(n+1)^{th}$ distribution key encryption data.

12. The method according to claim 10, wherein writing the $n^{th}$ information set to the blockchain comprises:

signing the $n^{th}$ information set according to the $n^{th}$ private key; and writing the signed $n^{th}$ information set to the blockchain.

13. The method according to claim 7, wherein before decrypting the $n^{th}$ distribution key encryption data according to the $n^{th}$ private key, the method further comprises:

performing signature verification on a signed production information set according to a production public key; or performing signature verification on a signed $n^{th}$ information set according to the $n^{th}$ public key.

14. A blockchain-based method for decrypting product information, comprising:

retrieving a production random number from a trusted repository based on a unique secret code of a product;

unidirectionally generating a production encryption key according to the unique secret code of the product and the retrieved production random number;

generating a production information query identifier based on the unique secret code associated with the production encryption key;

reading production information encryption data of the product from a blockchain by using the production information query identifier stored at the blockchain, wherein the production information encryption data comprises production information encrypted by the production encryption key; and decrypting the production information encryption data according to the production encryption key, to obtain the production information.

15. The method according to claim 14, further comprising:

unidirectionally generating a first distribution key according to the production encryption key, unidirectionally generating an $n^{th}$ encryption key according to an $n^{th}$ distribution key, and unidirectionally generating an $(n+1)^{th}$ distribution key according to the $n^{th}$ encryption key;

reading $n^{th}$ distribution information encryption data of the product from the blockchain according to an $n^{th}$ distribution information query identifier; and decrypting the $n^{th}$ distribution information encryption data according to the $n^{th}$ encryption key, to obtain $n^{th}$ distribution information, wherein n is a natural number greater than 0.

16. The method according to claim 14, wherein retrieving the production random number from the trusted repository based on the unique secret code of the product comprises:

unidirectionally generating a random number query identifier according to the unique secret code of the product; and obtaining the production random number corresponding to the random number query identifier from the trusted repository.

17. The method according to claim 15, wherein unidirectionally generating the $n^{th}$ encryption key according to the $n^{th}$ distribution key comprises:

obtaining an $n^{th}$ random number corresponding to an $n^{th}$ random number query identifier from the trusted repository; and unidirectionally generating the $n^{th}$ encryption key according to a combination of the $n^{th}$ distribution key and the $n^{th}$ random number, wherein n is a natural number greater than 0.

18. The method according to claim 17, wherein reading the production information encryption data of the product from the blockchain comprises:

unidirectionally generating the production encryption key according to a combination of the unique secret code and the production random number, unidirectionally generating the first distribution key, and unidirectionally generating the production information query identifier; and reading the production information encryption data in a production information set from the blockchain according to the production information query identifier; and reading the $n^{th}$ distribution information encryption data of the product from the blockchain comprises:

unidirectionally generating the $n^{th}$ encryption key according to a combination of the $n^{th}$ distribution key and the $n^{th}$ random number, unidirectionally generating the $(n+1)^{th}$ distribution key, and unidirectionally generating the $n^{th}$ distribution information query identifier; and reading the $n^{th}$ distribution information encryption data in an $n^{th}$ information set from the blockchain according to the $n^{th}$ distribution information query identifier.

\* \* \* \* \*